US008184308B2

(12) United States Patent
Miyata

(10) Patent No.: US 8,184,308 B2
(45) Date of Patent: May 22, 2012

(54) IMAGE FORMING APPARATUS, PRINT CONTROL PROGRAM, APPLICATION PROGRAM AND PRINTING SYSTEM

(75) Inventor: Yuji Miyata, Kitanagoya (JP)

(73) Assignee: Brother Kogyo Kabushiki Kaisha, Nagoya-shi, Aichi-ken (JE)

( * ) Notice: Subject to any disclaimer, the term of this patent is extended or adjusted under 35 U.S.C. 154(b) by 1343 days.

(21) Appl. No.: 11/747,498

(22) Filed: May 11, 2007

(65) Prior Publication Data

US 2007/0263239 A1 Nov. 15, 2007

(30) Foreign Application Priority Data

May 11, 2006 (JP) ................................. 2006-132315

(51) Int. Cl.
*G06F 15/00* (2006.01)
*G06K 1/00* (2006.01)

(52) U.S. Cl. ...................................... 358/1.14; 358/1.15
(58) Field of Classification Search .................... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| 5,889,929 | A | 3/1999 | Hori et al. |
| 5,950,036 | A | 9/1999 | Konishi |
| 6,046,820 | A | 4/2000 | Konishi |
| 6,271,934 | B1 | 8/2001 | Hayashi |
| 6,504,950 | B1 | 1/2003 | Murashita et al. |
| 6,505,252 | B1 | 1/2003 | Nagasaka |
| 6,519,049 | B1 | 2/2003 | Nagasaka |
| 6,655,779 | B2 | 12/2003 | Usui et al. |
| 6,825,944 | B1 | 11/2004 | Noda |
| 6,839,066 | B2 | 1/2005 | Muramoto |
| 6,963,424 | B1 | 11/2005 | Higuchi |
| 6,975,418 | B1 | 12/2005 | Ohta et al. |
| 6,981,053 | B2 | 12/2005 | Nagasaka |
| 6,995,855 | B2 | 2/2006 | Nagasaka |
| 7,035,454 | B2 | 4/2006 | Kumada et al. |
| 7,079,270 | B2 | 7/2006 | Kiyosu et al. |
| 7,099,025 | B2 | 8/2006 | Nagashima |
| 7,177,469 | B2 | 2/2007 | Kagawa et al. |
| 7,327,490 | B2 | 2/2008 | Kuwata et al. |
| 7,350,086 | B2 | 3/2008 | Nakajima |
| 7,375,848 | B2 | 5/2008 | Nakami et al. |
| 2002/0001092 | A1 | 1/2002 | Takebayashi |
| 2002/0118385 | A1* | 8/2002 | Nagashima .................. 358/1.15 |
| 2002/0131070 | A1 | 9/2002 | Housel et al. |

(Continued)

FOREIGN PATENT DOCUMENTS

JP  9307763  11/1997

(Continued)

OTHER PUBLICATIONS

Office Action in corresponding application JP 2006-132315, dated May 13, 2008.

(Continued)

*Primary Examiner* — Thierry Pham
(74) *Attorney, Agent, or Firm* — Banner & Witcoff, Ltd.

(57) ABSTRACT

An image forming apparatus includes a calibration information generating unit that generates calibration information, an identification information generating unit that generates identification information associating the generated calibration information, a receiving unit that receives identification information from an external device, and a print control unit that controls the image forming apparatus to pause a printing process.

19 Claims, 14 Drawing Sheets

U.S. PATENT DOCUMENTS

| | | |
|---|---|---|
| 2002/0135687 A1 | 9/2002 | Nakajima et al. |
| 2002/0140952 A1 | 10/2002 | Fukasawa |
| 2003/0086119 A1 | 5/2003 | Nagasaka |
| 2003/0228055 A1 | 12/2003 | Kanagawa et al. |
| 2004/0075754 A1 | 4/2004 | Nakajima et al. |
| 2005/0190389 A1 | 9/2005 | Tanaka |
| 2005/0275866 A1* | 12/2005 | Corlett .................. 358/1.14 |
| 2006/0119874 A1* | 6/2006 | Kurihara .................. 358/1.13 |
| 2007/0019258 A1* | 1/2007 | Hattori .................. 358/518 |

FOREIGN PATENT DOCUMENTS

| | | | |
|---|---|---|---|
| JP | 10-000795 A | | 1/1998 |
| JP | 10-114128 | | 5/1998 |
| JP | 10-181102 | | 7/1998 |
| JP | 10-181102 A | | 7/1998 |
| JP | 10-244705 | | 9/1998 |
| JP | 11-184777 | | 7/1999 |
| JP | 11338443 | | 12/1999 |
| JP | 2000-155653 | | 6/2000 |
| JP | 2000-155653 A | | 6/2000 |
| JP | 2000-253252 | | 9/2000 |
| JP | 2001-018498 | | 1/2001 |
| JP | 2001051810 | | 2/2001 |
| JP | 2001219605 A | * | 8/2001 |
| JP | 3603632 | | 12/2001 |
| JP | 2002051230 | | 2/2002 |
| JP | 2002-183528 | | 6/2002 |
| JP | 2002163098 | | 6/2002 |
| JP | 2002214978 | | 7/2002 |
| JP | 2002187314 | | 7/2002 |
| JP | 2002225307 | | 8/2002 |
| JP | 2002-316467 A | | 10/2002 |
| JP | 2002-328798 | | 11/2002 |
| JP | 2002-342044 | | 11/2002 |
| JP | 2003008917 | | 1/2003 |
| JP | 2003-058353 | | 2/2003 |
| JP | 2003060924 | | 2/2003 |
| JP | 2003099223 | | 4/2003 |
| JP | 2003101805 | | 4/2003 |
| JP | 2003150342 | | 5/2003 |
| JP | 2003-202713 | | 7/2003 |
| JP | 2004-032399 | | 1/2004 |
| JP | 2004007764 | | 1/2004 |
| JP | 2004-128920 | | 4/2004 |
| JP | 3520860 | | 4/2004 |
| JP | 2004199387 | | 7/2004 |
| JP | 2005115810 | | 4/2005 |
| JP | 3658461 | | 6/2005 |
| JP | 3689836 | | 8/2005 |
| JP | 3698118 | | 9/2005 |
| JP | 2005297408 | | 10/2005 |
| JP | 2006-026937 A | | 2/2006 |
| JP | 2006-173865 | | 6/2006 |
| JP | 2007-036370 | | 2/2007 |

OTHER PUBLICATIONS

Office Action in Japanese Application No. 2005-315696, mailed Sep. 24, 2008.

Office Action in Japanese Application No. 2005-315696, mailed Dec. 22, 2008.

Office Action issued Sep. 29, 2009 in Japanese Patent Application No. 2005-212859, and English translation thereof.

Non-Final Office Action issued Dec. 27, 2007 in U.S. Appl. No. 11/490,310.

Final Office Action issued Jul. 21, 2008 in U.S. Appl. No. 11/490,310 dated Jul. 21, 2008.

Non-Final Office Action issued Mar. 9, 2009 in U.S. Appl. No. 11/490,310.

Final Office Action issued Nov. 25, 2009 in U.S. Appl. No. 11/490,310.

* cited by examiner

FIG. 9

CALIBRATION DATA IS DIFFERENT.
NO OPTIMAL PRINTING RESULT MAY BE OBTAINED IF
PRINTING IS CONTINUED, BUT IS PRINTING EXECUTED?

GO: PRINT    CANCEL: DISCONTINUE

CALIBRATION DATA IS DIFFERENT.
NO OPTIMAL PRINTING RESULT MAY BE OBTAINED IF
PRINTING IS CONTINUED. IS THE PRINTING RE-ATTEMPTED
BY OBTAINING AGAIN THE CALIBRATION DATA?

GO: REPRINT    CANCEL: CONTINUE PRINTING

IMAGE FORMING APPARATUS, PRINT CONTROL PROGRAM, APPLICATION PROGRAM AND PRINTING SYSTEM

CROSS-REFERENCE TO RELATED APPLICATION

This application claims priority from Japanese Patent Application No. 2006-132315, filed on May 11, 2005, the entire subject matter of which is incorporated herein by reference.

TECHNICAL FIELD

Illustrative aspects of the present invention relate to an image forming apparatus which is capable of executing print processing of image data received from an external device, a print control program for controlling the print processing of the image forming apparatus, an application program of a computer which gives the image forming apparatus instructions for print processing of image data and a printing system including the image forming apparatus and the external device.

BACKGROUND

An image forming apparatus, which executes the print processing of image data received from a PC or the like, undergoes a change in image output characteristics, depending on an environment in which the device is used, elapsed time and other criteria. For example, in a laser printer, even when the same image data is subjected to print processing, quality of output image changes depending on the consumption of toner, change in photosensitive characteristics of a drum with secular variation and others. In order to correct the image output characteristics, image data subjected to print processing at an image forming apparatus is to be corrected by using correction data. The correction data is data generated on the basis of calibration data obtained at the image forming apparatus for the purpose of correcting the image output characteristics. The calibration data is observed concentration data that is obtained by transferring a test pattern to a photosensitive drum and reading the test pattern with the use of a sensor, for example. When the image data is corrected by using a computer such as a PC, the correction data is generated by the computer on the basis of the calibration data transferred from the image forming apparatus. Then, the image data subjected to print processing is to be corrected by using the generated correction data.

SUMMARY

Aspects of the present invention prevent obtaining calibration information from an image forming apparatus by every print-start instruction when image data corrected by using correction data is transmitted to the image forming apparatus for printing, and prevent print processing which receives and prints image data corrected by using correction data generated on the basis of previous calibration information from being executed by the image forming apparatus.

BRIEF DESCRIPTION OF DRAWINGS

FIG. 9 is a screen diagram showing the first selection screen;

FIG. 13 is a screen diagram showing the second selection screen; and

DETAILED DESCRIPTION

<General Overview>

Figure 1:
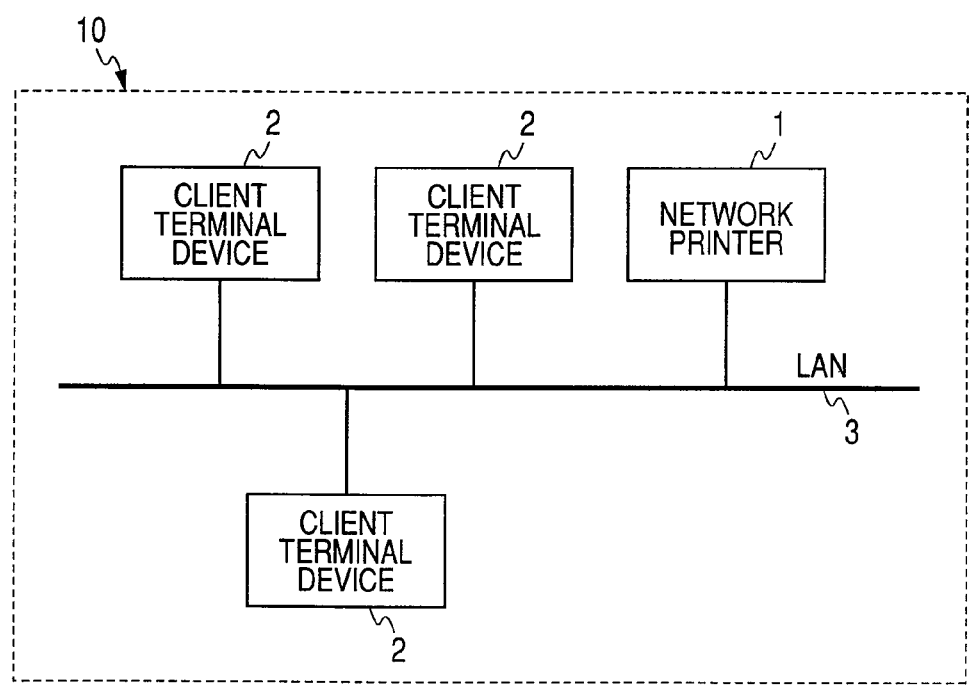
FIG. 1 is a diagram showing a printing system including a network printer and a client terminal device which instructs the network printer to print image data according to an aspect of the present invention.

According to an aspect of the invention, there is provided an image forming apparatus comprising: a calibration information generating unit that generates calibration information; an identification information generating unit that generates an identification information associating the generated calibration information; a receiving unit that receives identification information from an external device; and a print control unit that controls the image forming apparatus to pause a printing process.

According to another aspect of the invention, there is provided a computer program product embodied on a computer readable medium which, when executed by a computer, causes the computer to execute operations comprising: generating calibration information; generating identification information associating the calibration information; receiving identification information; judging whether the generated identification information matches the received identification information; and controlling an image forming apparatus to pause a printing process.

According to still another aspect of the invention, there is provided a computer program product embodied on a computer readable medium which, when executed by a computer which communicates with an image forming apparatus, causes the computer to execute operations comprising: generating correction data based on calibration information; correcting image data to be printed by the image forming apparatus by using the generated correction data; transmitting identification information associating the calibration information to the image forming apparatus; and transmitting the corrected image data to the image forming apparatus after the transmission of the identification information.

According to still another aspect of the invention, there is provided a printing system comprising: an external device that corrects image data by using correction data; and an image forming apparatus which communicates with the external device and is capable of receiving the corrected image data from the external device and printing the corrected image data, wherein the image forming apparatus comprises: a calibration information generating unit that generates calibration information; an identification information generating unit that generates identification information associating the generated calibration information; a receiving unit that receives identification information from the external device; a matching unit that matches whether the generated identification information matches the received identification information; and a print control unit that pauses a printing process which is instructed by the external device in accordance with the matching unit; and wherein the external device comprises: a correction unit that corrects image data to be printed by the image forming apparatus by using correction data previously generated based on calibration information; an identification information transmitting unit that transmits to the image forming apparatus the received identification information; and an image data transmitting unit that transmits the corrected image data to the image forming apparatus after the transmission of the received identification information.

According to still another aspect of the invention, there is provided an image forming apparatus comprising: a calibration information generating unit that generates a calibration information; an identification information generating unit that generates a identification information; a receiving unit that receives identification information from an external device; a matching unit that matches the generated identification information with the received identification information; and a print control unit that pause printing process in accordance with the matching unit.

<Illustrative Aspects>

Hereinafter, a description will be given of an aspect of the present invention by appropriately referring to the drawings. In the description that follows, various connections are set forth between elements in various overall structures. The reader should understand that these connections in general, and unless specified otherwise, may be direct or indirect and that this specification is not intended to be limiting in this respect.

FIG. 1 is a diagram showing a printing system 10 including a network printer 1 functioning as an image forming apparatus, and a client terminal device 2 functioning as an external device or a computer which instructs the network printer 1 to print image data according to an illustrative aspect of the present invention. As shown in FIG. 1, the printing system 10 is configured by connecting three units of the client terminal device 2 with the network printer 1 via a Local Area Network (herein after LAN) 3. It is noted that the client terminal device 2 connected with the network printer 1 is not restricted to three units. The client terminal device 2 may be available in one unit or in plural numbers other than three units. It is also acceptable that a plurality of the network printers 1 is connected to the LAN 3.

Figure 2:
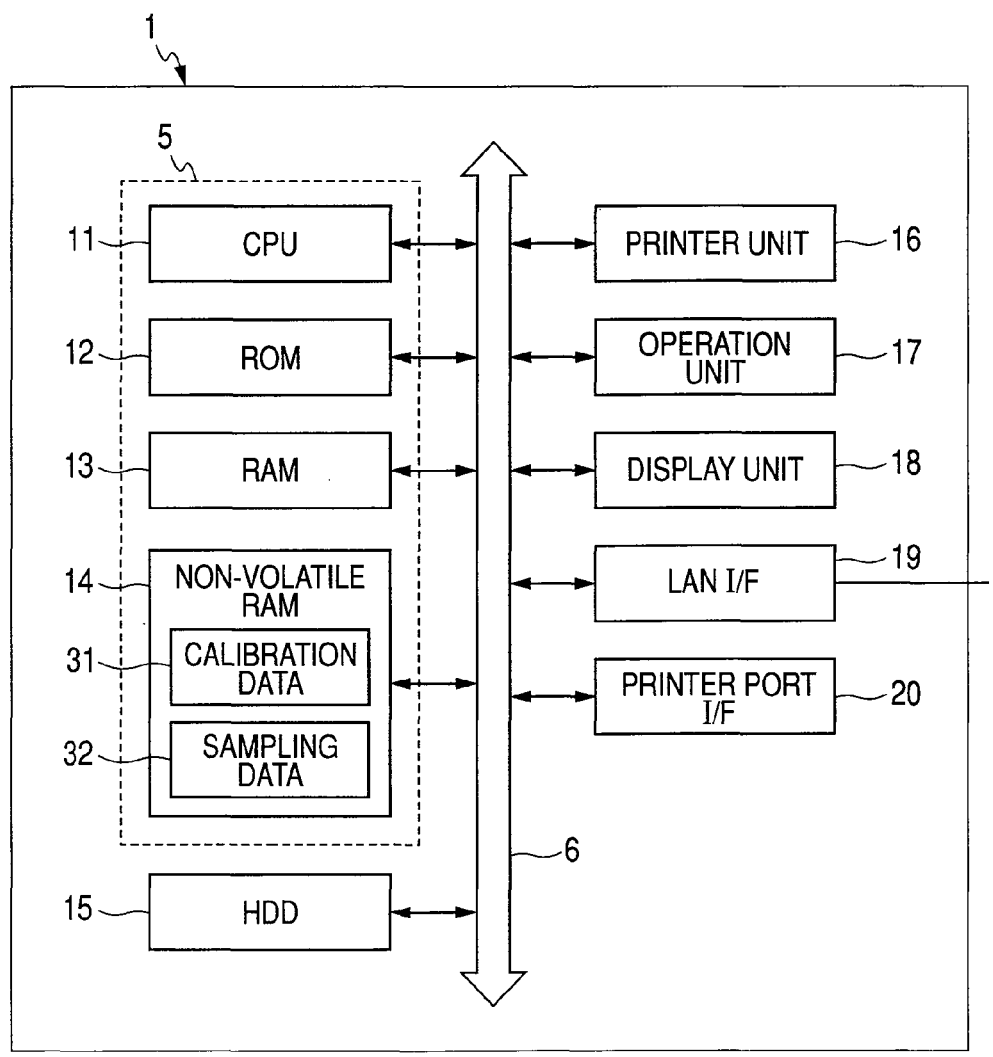
FIG. 2 is a block diagram showing a configuration of a control unit of the network printer.

Hereinafter, a detailed description will be given of a configuration of the network printer 1. FIG. 2 is a block diagram showing a configuration of a control unit 5 of the network printer 1.

The network printer 1 is capable of executing print processing for receiving image data from a client terminal device 2 and printing the data. In this case, the print processing includes the processing for receiving the image data and the processing for printing the received image data. As will be described later, image data, which is subjected to print processing, is image data corrected by using correction data 36 (refer to FIG. 3) in the client terminal device 2. The correction data 36 is generated on the basis of sampling data 35, which is equivalent to the calibration information, obtained from the network printer 1. The network printer 1 is a so-called page printer which is capable of executing the print processing by page. The network printer 1 receives image data (hereinafter, also referred to as PDL data) described in a page description language (PDL) from the client terminal device 2 and executes the print processing.

The control unit 5 of the network printer 1 controls the entire operation of the network printer 1. As shown in FIG. 2, the control unit 5 is configured as a microcomputer mainly composed of a CPU 11, a ROM (read only memory) 12, a RAM (random access memory) 13 and a non-volatile RAM (NVRAM) 14, and communicatively connected with a HDD (hard disk drive) 15, a printer unit 16, an operation unit 17, a display unit 18, a LAN I/F (local area network interface) 19 and a printer port I/F (printer port interface) 20 via a bus 6. It is noted that the network printer 1 is not restricted to the above configuration but may be appropriately changed in configuration within a scope of the present invention.

The CPU 11 controls individual portions that configures the network printer 1 in accordance with a program accommodated into the ROM 12 or the like. The RAM 13 functions as a main memory of the CPU 11, a work area or the like and accommodates various types of information. PDL data transmitted from the client terminal device 2 is temporarily accommodated into the RAM 13. The PDL data accommodated into the RAM 13 is subjected to print processing in the printer unit 16. The non-volatile RAM 14 is a memory for storing various types of data on the network printer 1 and data to be stored in the power off. The non-volatile RAM 14 stores calibration data 31 and sampling data 32, which is equivalent to the calibration information and is one example of the first identification information, so as to be mutually associated. The control unit 5, which is composed of the CPU 11, the ROM 12, the RAM 13 and the non-volatile RAM 14, configures a calibration information generating unit, an identification information generating unit, a receiving unit, a judging unit, a print control unit, a first transmitting unit (an update information transmitting unit) and a second transmitting unit according to the aspects of the present invention. The calibration data 31 and the sampling data 32 are data for correcting the image output characteristics of the network printer 1. The calibration data 31 is observed data obtained by transferring a test pattern to a photosensitive drum (not shown) of the printer unit 16 and scanning the test pattern by an optical sensor. The sampling data 32 is information (identification information) capable of identifying the calibration data 31. The sampling data 32 is data obtained by extracting a part of the data from the calibration data 31. For example, the sampling data 32 may be data capable of reproducing the calibration data 31. Therefore, if the sampling data 32 is stored in the non-volatile RAM 14, the calibration data 31 is not necessarily stored. The calibration data 31 and the sampling data 32 will be described in detail later.

The HDD 15 stores various programs. A print control program of the present invention is stored in the HDD 15. The print control program is a program which is executed by a control unit 5 of the network printer 1 capable of executing the print processing for receiving PDL data from the client terminal device 2 and printing the data onto a recording sheet. The print control program allows the control unit 5 to function as a calibration information generating unit, an identification information generating unit, a receiving unit, a judging unit, a print control unit, a first transmitting unit (an update information transmitting unit) and a second transmitting unit, which will be described later.

The printer unit 16 executes the print processing of PDL data received from the client terminal device 2. The PDL data includes one or a plurality of pieces of page data (one page's worth of image data). The printer unit 16 executes the print processing (hereinafter, also referred to as simply "printing") by each page data. Although not shown in the present invention, the printer unit 16 may be a so-called laser printer in which a laser diode (LD) is used as a light-emitting diode for forming an electrostatic latent image onto the surface of a photosensitive drum. In the present aspect, the printer unit 16 records an image of page data on a recording medium to be recorded such as a recording sheet by using toner of four different colors, cyan (C), magenta (M), yellow (Y) and black (K). Further, there are no particular restrictions on the printer unit 16 as long as it is a printer which needs calibration, and other types such as an ink jet printer, for example, may be usable.

The operation unit 17 is configured by various operation keys and others mounted on the network printer 1. A user makes various types of operation inputs via the operation unit 17. The operation unit 17 has a "GO" (or "OK") button and a "CANCEL" button. These buttons are used, for example, when the print processing for receiving page data from the client terminal device 2 and printing the data is temporarily stopped). The "GO" button is used for selecting print resumption or reprint (refer to FIG. 9 and FIG. 13). The "CANCEL" button is used for selecting print discontinuation or print resumption (refer to FIG. 9 and FIG. 13). In other words, the operation unit 17 configures the first accepting unit and the second accepting unit of the present invention. As will be described in detail later, the print resumption instructs the resumption of the print processing, which is temporarily stopped. The reprint instructs the discontinuation of the print processing, which is temporarily stopped, and the re-attempt of the print processing. The print discontinuation instructs the discontinuation of the print processing, which is temporarily stopped. The network printer 1 operates in accordance with an operation input from the operation unit 17 and also operates in accordance with instructions transmitted from the client terminal device 2 via a printer driver or the like.

The display unit 18 may be configured by a liquid-crystal display panel mounted on the network printer 1, displaying various setting conditions and an operating state of the network printer 1. The display unit 18 functions as a notification unit, a first displaying unit and a second displaying unit.

The LAN I/F 19 is an interface for communicatively connecting the LAN 3 with the network printer 1. The printer port I/F 20 is an interface for connecting the client terminal device 2 with the network printer 1. In the present aspect, the network printer 1 is communicatively connected with the client terminal device 2 via the LAN I/F 19. As a matter of course, it is also possible to connect the client terminal device 2 with the network printer 1 via the printer port I/F 20.

Although not described in detail, the printer unit 16 of the network printer 1 has a charger, a photosensitive drum, an exposure device, a developer, a transfer device, a fixing device and the like. The printer unit 16 undergoes a change in image output characteristics, depending on an environment at which the network printer 1 is used, operating time and others. In other words, output images, which are outputted from the printer unit 16, (in other words, the image density recorded onto a recording sheet or the like) change due to the consumption of toner, change in photosensitive characteristics of a photosensitive drum with secular variation, and the like. In order to correct the change in image output characteristics, the control unit 5 obtains calibration data. The calibration data is obtained, for example, by transferring a test pattern on the photosensitive drum and scanning the test pattern with the use of an optical sensor. In other words, the calibration data is data which indicates observed an image density of the test pattern scanned by the optical sensor.

The control unit 5, which functions as the calibration information generating unit and the identification information generating unit, generates calibration information and also generates first identification information capable of identifying the generated calibration information. In the present aspect, the sampling data 32 is the calibration information and also the first identification information. Therefore, the control unit 5 generates the sampling data 32 as the calibration information and the first identification information. Since the sampling data 32 is generated on the basis of the calibration data 31, it is generated together when the calibration data 31 is obtained.

The control unit 5 obtains the calibration data covering four color compositions of C, M, Y and K by using the optical sensor of the printer unit 16, for example, every day. Since a method for obtaining the calibration data is known, a description of the method is omitted here. The control unit 5 rewrites the calibration data 31 stored in the non-volatile RAM 14 into the obtained calibration data. Thereby, previous calibration data 31 stored in the non-volatile RAM 14 is updated to the updated calibration data 31. The sampling data 32 is information corresponding to the calibration data 31. Therefore, the control unit 5 updates the calibration data 31 of the non-volatile RAM 14 and also extracts a part of the data from the calibration data 31 to generate new sampling data. The control unit 5 rewrites the sampling data 32 stored in the non-volatile RAM 14 into the generated sampling data. As described above, the calibration data 31 and the sampling data 32 stored in the non-volatile RAM 14 are updated by the control unit 5, for example, every day or every time the image data records 100 pieces of media to be recorded. In the present aspect, a description will be given of a case where the calibration data 31 and the sampling data 32 are updated every day.

The control unit 5 corresponding to the first transmitting unit (an update information transmitting unit) transmits regularly the generated calibration information and the first identification information to the client terminal device 2. In the present aspect, the control unit 5 transmits the sampling data 32 stored in the non-volatile RAM 14 to the client terminal device 2 every three days. In the client terminal device 2, sampling data 35 obtained from the network printer 1 is stored in the HDD 24 (refer to FIG. 3). The sampling data 35 is updated by being rewritten into the sampling data 32 when the sampling data 32 has been transmitted from the network printer 1.

As described above, the sampling data 32 of the network printer 1 is updated every day, whereas the sampling data 35 of the client terminal device 2 is updated every three days. In other words, the sampling data 32 and the sampling data 35 are to be updated in an asynchronous timing. Therefore, there is a case where the sampling data 32 and the sampling data 35 are the same data or a case where they are different data.

Figure 3:
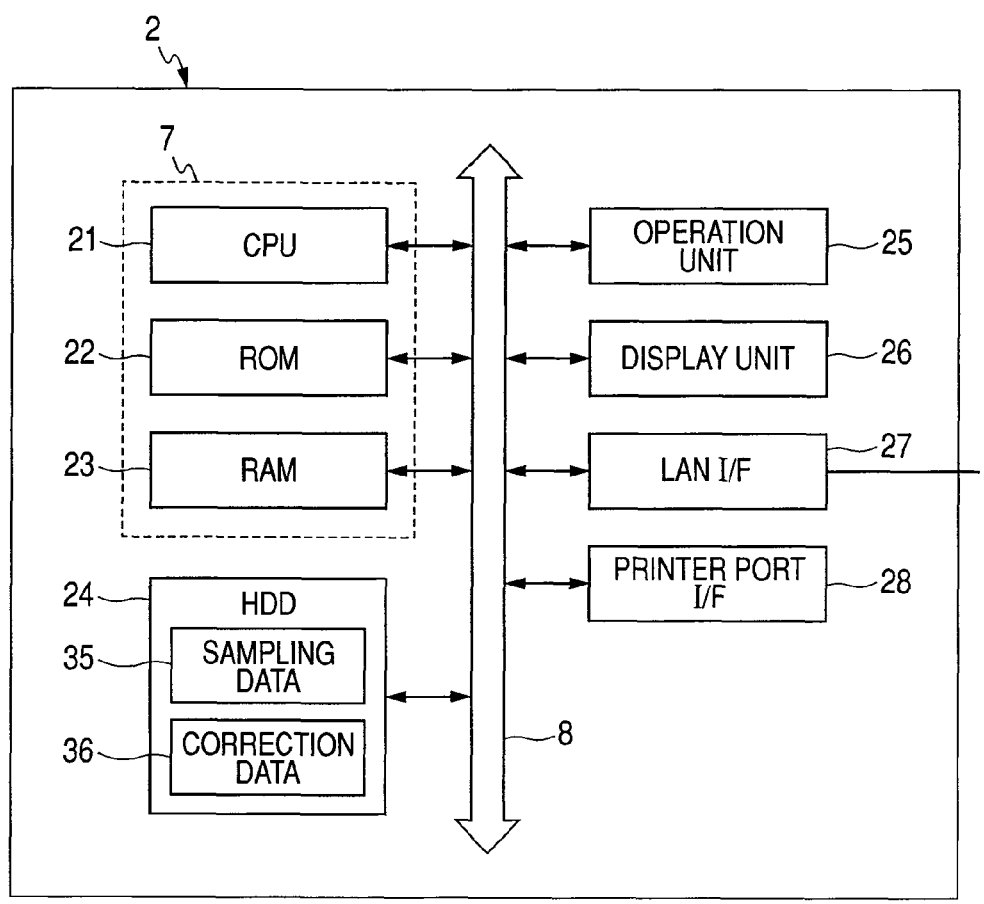
FIG. 3 is a block diagram showing a configuration of a control unit of the client terminal device.

Hereinafter, a description will be given of a configuration of the client terminal device 2. FIG. 3 is a block diagram showing a configuration of the control unit 7 of the client terminal device 2.

The client terminal device 2 is, for example, a personal computer. The client terminal device 2 is communicatively connected with the network printer 1 capable of executing print processing. The client terminal device 2 uses the correction data 36 to correct the image data and transmit the corrected image data (in this case, PDL data) back to the network printer 1 for the purpose of printing.

The control unit 7 controls the entire operation of the client terminal device 2. The control unit 7 is configured as a microcomputer mainly by a CPU 21, a ROM 22 and a RAM 23, and is communicatively connected with a HDD 24, an operation unit 25, a display unit 26, a LAN I/F 27 and a printer port I/F 28 via a bus 8. Further, the configuration of the client terminal device 2 is not restricted thereto but may include any modifications within a scope of the present invention.

The CPU 21 controls actions of individual portions of the client terminal device 2 and operates in accordance with a driver (for example, a printer driver) for controlling the operating system (OS) and various hardware as well as programs such as various application software. The ROM 22 accommodates programs or the like for controlling the client terminal device 2 and executing a computing operation. The RAM 23 is used as a main memory of the CPU 21, a work area and the like for temporarily storing various data used in executing the above programs by the CPU 21. The control unit 7 functioning as a storage unit temporarily stores in the RAM 23 the image data before being corrected on the basis of the correction data 36 to be described later. The control unit 7, which is composed of the CPU 21, the ROM 22 and the RAM 23, configures the correction unit, the identification information transmitting unit, the image data transmitting unit, the storage unit, the first update unit and the second update unit according to an exemplary embodiment of the present invention.

The HDD 24 is a storage device incorporating a storage medium having a large memory domain. The HDD 24 stores programs and data files used in the client terminal device 2. The control unit 5 generates image data on the basis of data files stored in the HDD 24. The generated image data is corrected on the basis of the correction data 36 and thereafter transmitted to the network printer 1 for the purpose of printing.

The HDD 24 stores sampling data 35 and correction data 36. The sampling data 35 is equivalent to the calibration information and is one aspect of the second identification information or the identification information. The correction data 36 is data which is used in correcting the image data for the purpose of correcting the image output characteristics of the network printer 1. The image data to be printed by the network printer 1 is corrected by using the correction data 36, thereby so-called calibration is executed. The image data printed by the network printer 1 is corrected by the correction data 36 and thereafter transmitted to the network printer 1 as PDL data.

The sampling data 35 is transmitted from the network printer 1, as described above. The sampling data 35 is generated by extracting a part of the data from the calibration data obtained in the network printer 1 and capable of reproducing the calibration data. Upon obtaining the sampling data 35 from the network printer 1, the control unit 7 reproduces the calibration data on the basis of the obtained sampling data 35. Then, the correction data 36 is generated on the basis of the reproduced calibration data.

The sampling data 35 is generated in a similar manner as the sampling data 32 (refer to FIG. 2). The sampling data 32 and the sampling data 35 are updated in an asynchronous timing. Therefore, there is a case where the sampling data 32 and the sampling data 35 are the same data or a case where they are different data. When the sampling data 32 and the sampling data 35 are the same, the correction data 36 is to be generated on the basis of the calibration data which is the same as the calibration data 31. Therefore, the image data to be printed by the network printer 1 is corrected by the correction data 36 generated on the basis of the updated calibration data 31. In contrast, when the sampling data 32 and the sampling data 35 are different, the correction data 36 is to be generated on the basis of the calibration data which is different from the calibration data 31. Therefore, image data printed by the network printer 1 is to be corrected by using the correction data 36 generated on the basis of previous calibration data instead of the updated calibration data 31.

The HDD 24 stores a printer driver functioning as an application program for transmitting image data to be printed to the network printer 1 connected communicatively. The control unit 7 functions as the correction unit, the identification information transmitting unit, the image data transmitting unit, the storage unit, the first update unit, and the second update unit in accordance with the printer driver.

Further, as will be described later, when data files accommodated into the HDD 24 is printed by the network printer 1, PDL data is generated, which is image data described in PDL on the basis of the data file. The generated PDL data is transmitted to the network printer 1. The PDL data is transmitted as page data which is separated by each page.

The operation unit 25 is made up of a keyboard, pointing devices and the like, receiving instructions for operating the client terminal device 2 and operation inputs such as set-up. The display unit 26 is made up of a CRT, a liquid crystal display and the like, and displays various types of information. More specifically, it displays an operating state of the client terminal device 2 and a set-up information and the like for setting printing conditions of print processing instructed for the network printer 1.

The LAN I/F 27 is an interface which communicatively connects the LAN 3 with the client terminal device 2. The printer port I/F 28 is an interface for connecting the client terminal device 2 with the network printer 1. In the present aspect, the client terminal device 2 and the network printer 1 are communicatively connected via the LAN I/F 27. They may be communicatively connected via the printer port I/F 28.

The sampling data 35 is obtained by extracting a part of the data (in this case, 11 pieces of data) by every color composition from calibration data of the respective 256 gradations (0 to 255) in each of the color compositions of C, M, Y and K obtained in the network printer 1. The control unit 7 reproduces calibration data on the basis of the sampling data 35, and generates the correction data 36 on the basis of the reproduced calibration data.

Figure 4:
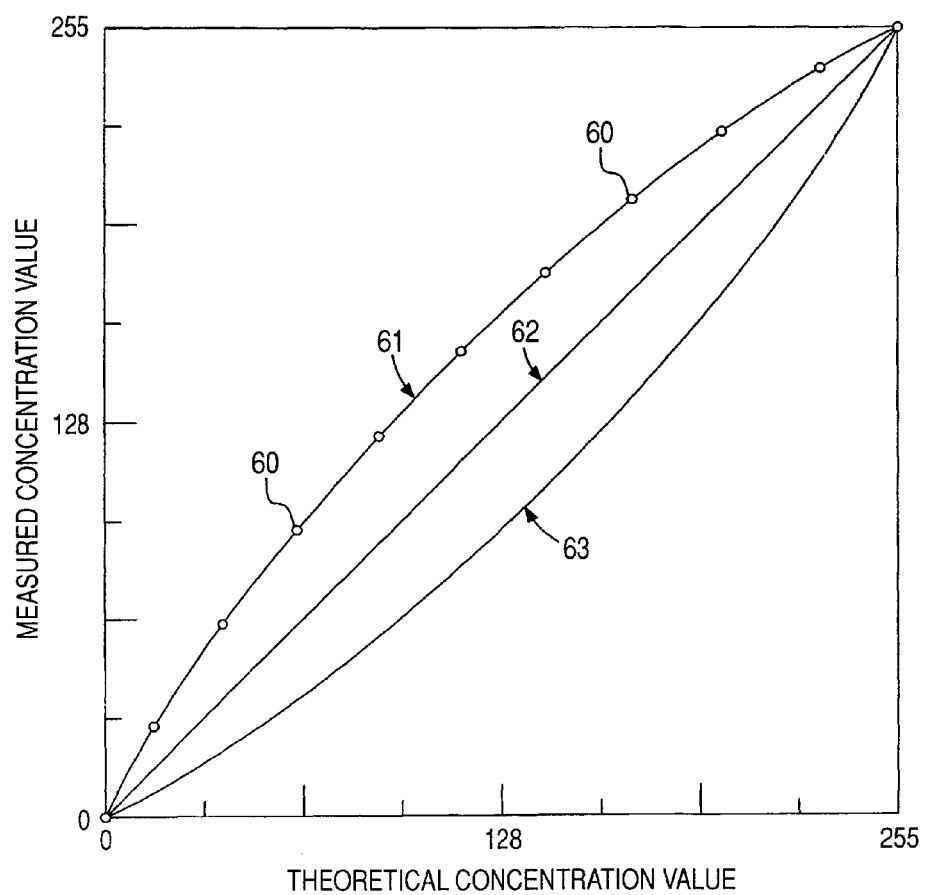
FIG. 4 is a graph for explaining the relationship between sampling data and correction data.

FIG. 4 is a drawing for explaining a relationship between the sampling data 35 and the correction data 36. The HDD 24 stores the sampling data 35 and the correction data 36 by each of the color compositions of C, M, Y and K. FIG. 4 illustrates a relationship between the sampling data 35 of C composition and the correction data 36 as an example.

In generating, for example, the correction data 36 of cyan, the control unit 7 at first reproduces a curve of the calibration data which is the basis of the sampling data 35 from the sampling data 35 of cyan, as shown in FIG. 4. Each of the eleven representative points 60 given in FIG. 4 indicates each data of the sampling data 35 of cyan, and a curve 61 indicates the reproduced calibration data. In FIG. 4, the abscissa indicates theoretical concentration values. The ordinate indicates actual density values, which are density of an image actually measured with respect to any predetermined theoretical density values. The curve 61 of calibration data is measured so that the control unit 7 passes through the above-described eleven representative points 60. Thereby, reproduced is the calibration data which is the basis of the sampling data 35. The reference numeral 62 given in FIG. 4 indicates a theoretical curve. The curve 61 of the calibration data reproduces the image output characteristics of the network printer 1. As is apparent from the comparison with the theoretical curve 62, when a test pattern is formed on a photosensitive drum and the test pattern is measured by using the optical sensor, a tendency that measured values measured by the optical sensor are greater than predetermined theoretical density values is found. The control unit 7 determines a correction curve 63, which is a curve obtained by plotting each data of the correction data 36 in such a way that the curve 61 indicating the image output characteristics of cyan composition of the network printer 1 closely relates the characteristics of the theoretical curve 62. A method for determining the correction curve 63 from the curve 61 is known, the description of which will be omitted here.

The correction data 36 stored in the HDD 24 is data on the correction curve 63. The correction data 36 corresponds to each of the colors, C, M, Y and K. The correction data 36 of each color contains 256 gradation stages of numeric data. Although not shown, these 256 gradation stages of numeric data are numeric data corresponding to contrasting density levels given to the network printer 1 where an actual printing matches desired at a contrasting density level to a contrasting density level (value) designated by the client terminal device 2. The correction data 36 is that in which contrasting density levels actually given to the network printer 1 on printing are arrayed in the order of contrasting density levels (0 to 255) which can be designated. Therefore, when a contrasting density level "254" is designated, for example, the $254^{th}$ stage of numeric data starting from zero is read out from the correction data 36, thereby obtaining the contrasting density level "253" which is to be given to the network printer 1. In this case, the correction data 36 of cyan C was referred to as an example. The correction data 36 of other colors such as M, Y and K are treated similarly, the description of which will be omitted here.

As described above, the sampling data 32 is to be transmitted regularly from the network printer 1 to client terminal device 2 (in this case, every three days). The control unit 7 functioning as the first update unit generates correction data on the basis of calibration information transmitted from the control unit 5 of the network printer 1 and updates the correction data used in correcting the image data to be printed. More specifically, the control unit 7 at first reproduces the calibration data, which is the basis of the sampling data 32, when the sampling data 32 has been transmitted from the network printer 1 in a state that a print-start instruction is not given in the client terminal device 2. Then, on the basis of the reproduced sampling data, the correction data is generated. The control unit 7 updates the correction data 36 by rewriting the correction data 36 stored in the HDD 24 into the generated correction data.

Further, the control unit 7 functioning as the second update unit updates the sampling data 35 (second identification information) stored in the client terminal device 2 to the sampling data 32 (first identification information) transmitted by the control unit 5. More specifically, the control unit 7 rewrites the sampling data 35 into the received sampling data 32 when the sampling data 32 is transmitted by the control unit 5, thereby updating the sampling data 35. As described above, the sampling data 35 and the correction data 36 stored in the HDD 24 of the client terminal device 2 are updated every three days or the like.

Figure 5:
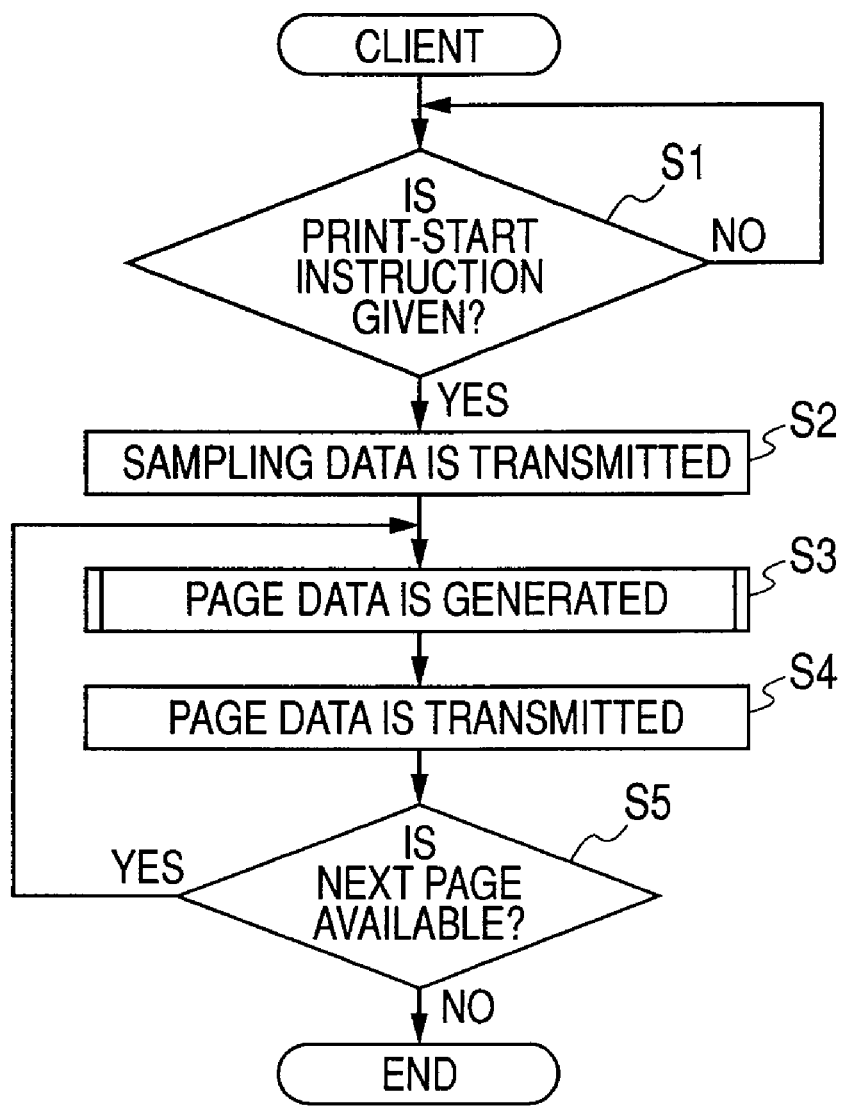
FIG. 5 is a flow chart showing processing actions executed in the client terminal device when a print-start instruction is input.
Figure 6:
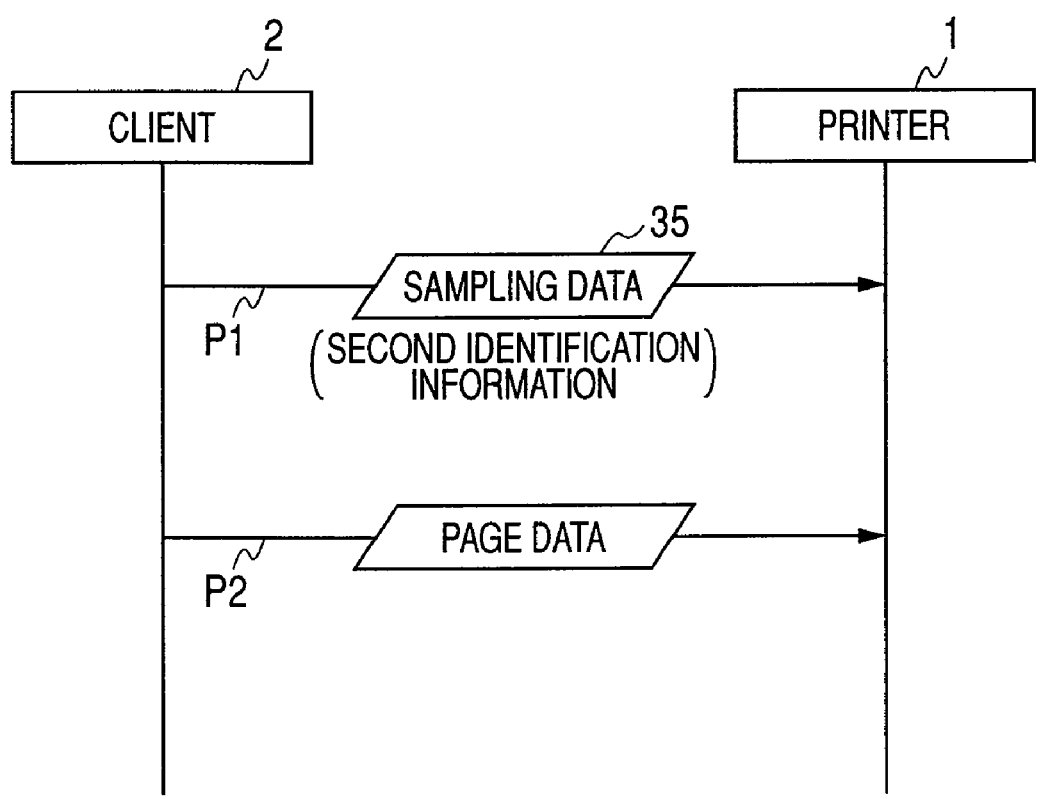
FIG. 6 is a drawing for explaining data transmitted between the client terminal device and the network printer 1.

FIG. 5 is a flowchart showing a processing action operated by the client terminal device 2 when a print-start instruction is input. FIG. 6 is a drawing showing data transmitted between the client terminal device 2 and the network printer 1.

Hereinafter, description will be given of a processing action operated by the client terminal device 2 when a print-start instruction is input. The control unit 7 judges whether the print-start instruction is input according to the presence or absence of a predetermined operation input for instructing to start printing from the operation unit 25 (S1). When the print-start instruction is judged not to be input (S1: NO), the operation is kept on standby. When the print-start instruction is judged to be input (S1: YES), the control unit 7 functioning as the identification information transmitting unit transmits sampling data 35 (refer to FIG. 3) to the network printer 1 which executes the print processing (S2, P1). The sampling data 35 includes information capable of identifying calibration information of the present invention, which is the basis of the correction data 36 used in correcting the image data. Therefore, the sampling data 35 in itself is to be transmitted as the identification information of the sampling data 35. Further, before the sampling data 35 is sent, a print job language (PJL) command is to be transmitted from the client terminal device 2 to the network printer 1. The control unit 5 of the network printer 1 determines that data received on the basis of the received PJL command is not PDL data subjected to print processing but the sampling data 35 transmitted as the second identification information.

Then, the control unit 7 generates page data which is image data for allowing the network printer 1 to execute the print processing (S3). The generated page data is PDL data described in PDL as described above or image data covering one page. The control unit 7 functioning as the image data transmitting unit transmits the page data generated in Step S3 via LAN I/F 27 to the network printer 1 after the sampling data 35 is transmitted (S4, P2). The page data is corrected by using correction data 36 stored in the HDD 24, the details of which will be described later.

The control unit 7, which transmitted the page data, judges whether a next page is available (S5). When it judges that the next page is available (S5: YES), the next page is subjected to processing action in Step S3 and S4. Accordingly, the image data to be printed by the network printer 1 is generated and transmitted by each page. In contrast, when the control unit 7 judges that no next page is available (S5: NO), it regards that all pages of data on which printing is instructed have been transmitted to the network printer 1, thereby completing the processing.

As described above, the sampling data 35 corresponding to the correction data 36 used in correction by the control unit 7 is transmitted to the network printer 1. In other words, the sampling data 35 or information capable of identifying calibration information, which is the basis of the correction data 36 used in correction by the control unit 7, is transmitted to the network printer 1. Then, PDL data which is image data corrected on the basis of correction data 36 is transmitted to the network printer 1 by every page data.

Figure 7:
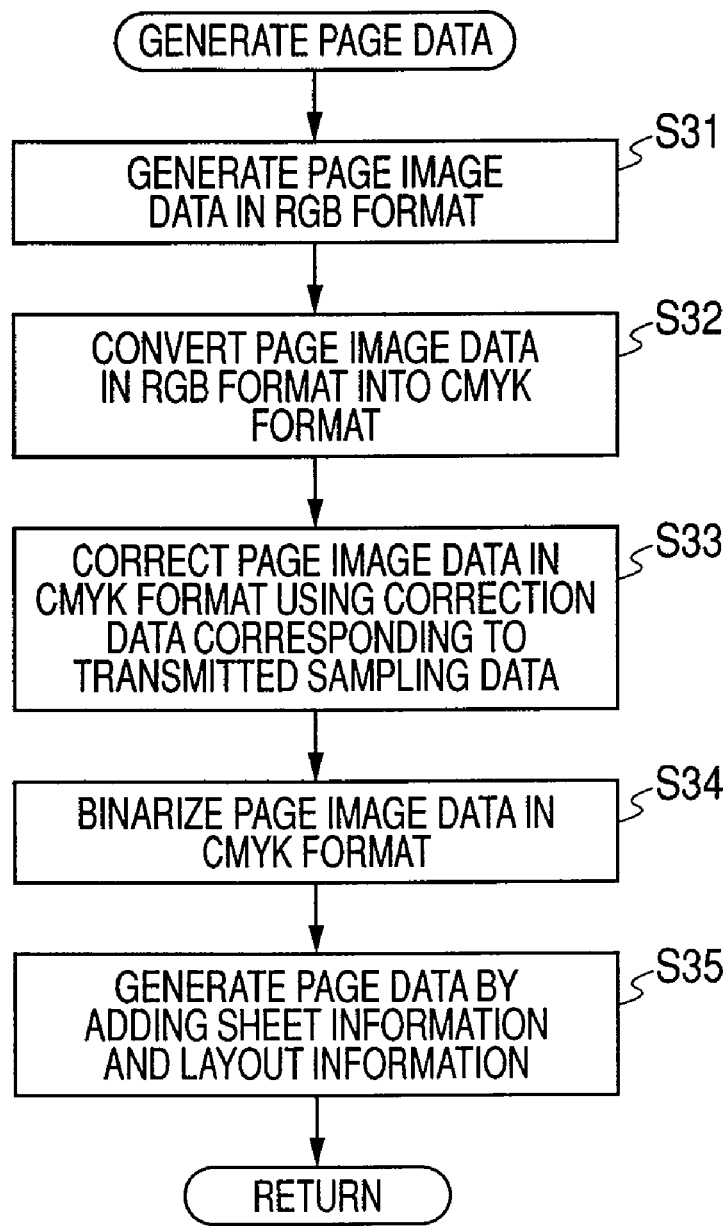
FIG. 7 is a detailed flow chart showing page data generating processing of Step S3 in FIG. 5.

FIG. 7 is a detailed flow chart showing processing for generating the page data in Step S3 of FIG. 5.

Upon transmitting the sampling data 35 stored in the HDD 24 in Step S2, the control unit 7 generates one-page image data in a color space of tristimulus values, i.e., RGB (red-green-blue).(S31). More specifically, one-page image data as RGB data, is generated on the basis of render commands from an application such as text render command and graphic render command. It is noted that the generated one-page image data is multiple-value color image data using an 8-bit value allows 256 colors to be simultaneously presented.

Next, the control unit 7 converts the generated one-page image data in an RGB space into a device specific color models such as CMYK (S32). Then, the correction data 36 corresponding to the sampling data 35 transmitted in Step S2 is used to correct the image data in CMYK format (S33). This correction is executed by every color composition of C, M, Y or K. As described above, the control unit 7 functioning as the correction unit corrects the image data (in this case, multiple-value image data of CMYK) by using the correction data 36. The control unit 7 may convert the image data from RGB to other color spaces (e.g. CMY, HSV, LUV, LHS, LAB)

Next, the control unit 7 uses, for instance an error diffusion method or a dither method, to binarize the multiple-value image data in CMYK format corrected on the basis of the correction data 36 (S34). Sheet information and layout information are added to the binarized page image data in CMYK format, thereby generating the page data (S35). Then, the processing is returned to Step S4, and the generated page data is transmitted back to the network printer 1.

As described above, the client terminal device 2 stores the correction data 36 for correcting the image output characteristics of the network printer 1 in the HDD 24. The correction data 36 is updated together with the sampling data 35, for example, once every three days. In other words, the sampling data 35 is obtained from the network printer 1 once every three days. The calibration data is reproduced on the basis of the obtained sampling data 35, and the correction data is generated on the basis of the reproduced calibration data. The correction data 36 stored in the HDD 24 is rewritten into the generated correction data. Thereby, the sampling data 35 and the correction data 36 are updated every three days.

When a print-start instruction is given, the client terminal device 2 generates page image data which is printed by the network printer 1. The generated page image data is corrected on the basis of the generated correction data 36. The client terminal device 2 stores the sampling data 35. The sampling data 35 is information capable of identifying calibration information which is the basis of the correction data 36 used in correcting the page image data. When the print-start instruction is given in the client terminal device 2, the sampling data 35 as the second identification information is transmitted to the network printer 1. Then, the page image data is corrected by using the correction data 36 corresponding to the sampling data 35. The corrected page image data is transmitted as page data to the network printer 1.

Figure 8:
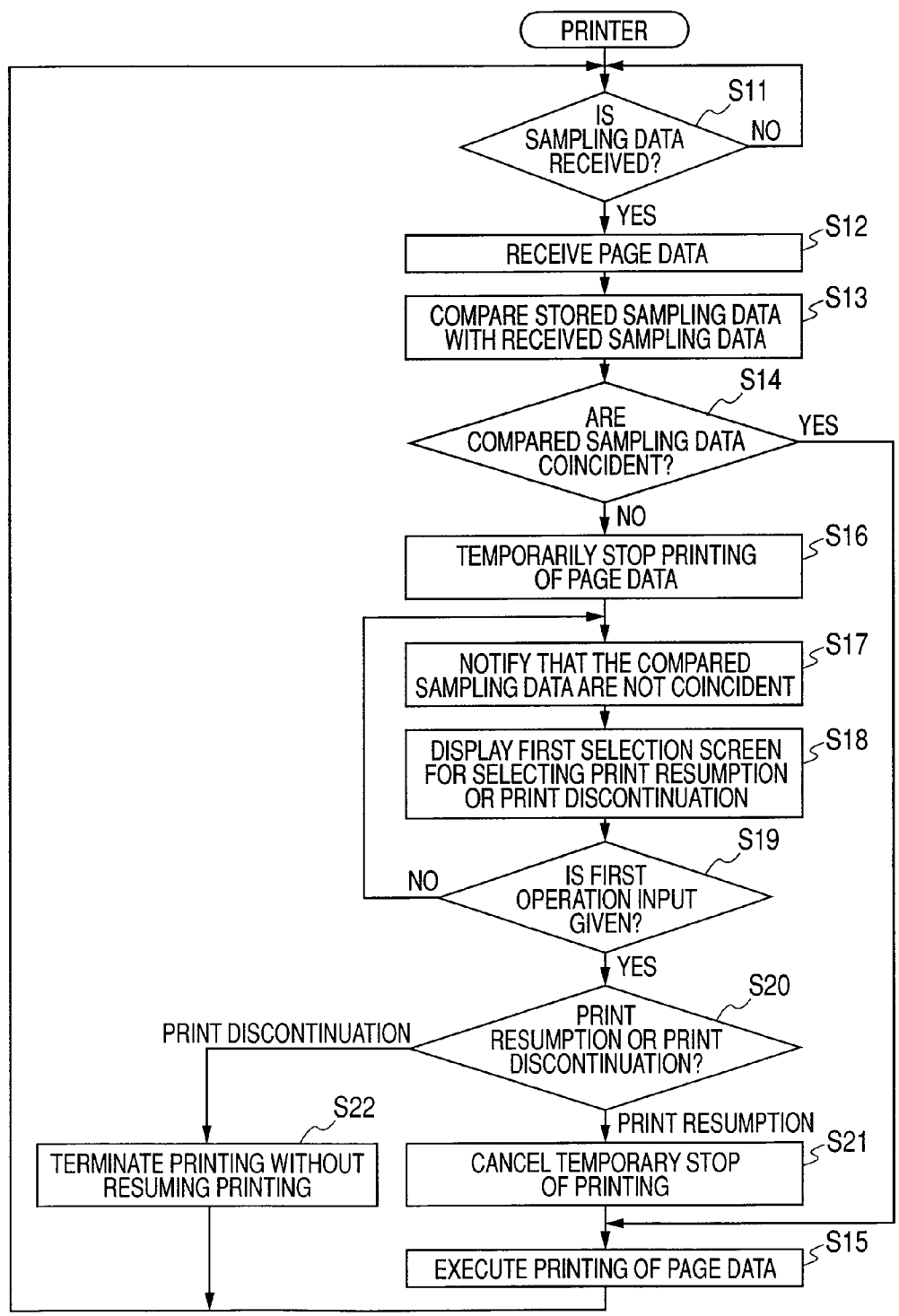
FIG. 8 is a flow chart showing processing actions executed in the network printer when the sampling data is received.

FIG. 8 is a flow chart showing processing actions executed in the network printer 1, when the sampling data 35 is received.

Hereinafter, a description will be given of processing actions executed in the network printer 1 which receives the sampling data 35 from the client terminal device 2 with reference to FIG. 8. The control unit 5 of the network printer 1 judges whether the sampling data 35 transmitted from the client terminal device 2 is received (S11). This judgment is made on the basis of a PJL command received from the client terminal device 2 which has instructed the print processing. When the sampling data 35 is judged not to be received (S11: NO), the processing is kept on standby. When the sampling data 35 is judged to be received (S11: YES), page data transmitted from the client terminal device 2 is received subsequently to the sampling data 35 (S12). As described above, the control unit 5 functioning as the receiving unit receives from the client terminal device 2 the sampling data 35, that is, information capable of identifying calibration information which is the basis of the correction data 36 used in correcting the image data in the client terminal device 2. Then, the control unit 5 receives page data, which is the image data corrected actually on the basis of the correction data 36. Subsequently thereto, the control unit 5 compares the sampling data 32 corresponding to the updated calibration data 31 stored in the network printer 1 with the sampling data 35 which has been judged to be received in Step S11 (S13).

Then, the control unit 5 functioning as the judging unit judges whether the updated sampling data 32 of the non-volatile RAM 14 matches the sampling data 35 received from the client terminal device 2 (S14). When the sampling data 32 of the non-volatile RAM 14 is judged to match the sampling data 35 (S14: YES), page data received in the step S12 is printed (S15). More specifically, the printer unit 16 is allowed to execute the print processing of page data received from the client terminal device 2 and temporarily stored in the RAM 13. After completion of the processing in Step S15 with respect to all page data received from the client terminal device 2 as a series of printing jobs, the processing is returned to the step S11.

When the control unit 5 functioning as the print control unit judges that the sampling data 32, of the non-volatile RAM 14 does not match received sampling data 35 (S14: NO), the received page data is temporarily stopped for printing (S16). In other words, when the first identification information is judged not to match the second identification information, the print processing instructed from the client terminal device 2 is temporarily stopped. It is noted that in the present aspect, a judgment in Step S14 is made after start of receiving the PDL data (one-page data) to be printed. Therefore, when the first identification information is judged not to match the second identification information, the print processing, which is executed after receipt processing, is to be interrupted halfway. It is also acceptable that the judgment (processing in Steps S13 and S14) may be made before the page data is received (before the processing in Step S12).

FIG. 9 is a screen diagram showing the first selection screen 40.

When the sampling data 32 is judged not to match the sampling data 35 in Step S14, the display unit 18 notifies to the effect that the data concerned does not match (S17). The display unit 18 functions as the notification unit and the first displaying unit. Then, similarly when the data concerned is judged not to match, a first selection screen 40 for selecting print resumption or print discontinuation (S18) is provided. More specifically, as shown in FIG. 9, the first selection screen 40 including a message, for example, "calibration data is different," which indicates that the sampling data 32 and the sampling data 35 are different or a message, for example, "no optimal printing result may be obtained if printing is continued, but is the printing executed?," which indicates to select the print resumption or the print discontinuation, is provided.

In this case, notification of the effect of not matching is notified in conjunction with the first selection screen 40. However, it is also acceptable that notification of the effect of not matching and provision of the first selection screen 40 for selecting print resumption or print discontinuation are executed separately. For example, an alarm sound may be outputted to warn that the sampling data 32 and the sampling data 35 are different, and the first selection screen 40 for selecting the print resumption or the print discontinuation may be provided on the basis of the output of the alarm sound. Incidentally, the indication that the sampling data 32 is different from the sampling data 35 means that correction data generated on the basis of the calibration data 31 is different from the correction data 36.

The control unit 5 judges whether a first operation input of selecting print resumption or print discontinuation is made via an operation unit 17 (S19). More specifically, a judgment is made for which button is depressed, that is, a GO (OK) button for selecting to print as it is (print resumption) or a CANCEL button for selecting to discontinue the printing (print discontinuation) is depressed. When the first operation input is not made (S19: NO), processing actions in Step S17 and the S18 are continued until the first operation input is made. When the first operation input is made (S19: YES), the operation unit 17, which is equivalent to the first accepting unit, accepts the first operation input of selecting the print resumption or the print discontinuation.

The control unit 5 judges whether the first operation input accepted by the operation unit 17 is to select print resumption or print discontinuation by referring to which button is depressed, the GO button or the CANCEL button (S20). When the first operation input accepted by the operation unit 17 is to select the print resumption (S20: print resumption), the control unit 5 cancels a paused printing (S21) and executes the processing in Step S15 to resume the printing paused in Step S16. In other words, the pause of print processing is cancelled to resume the print processing. Upon completion of the resumed print processing, the processing is returned to Step S11.

When the first operation input accepted by the operation unit 17 is to select the print discontinuation (S20: print discontinuation), the control unit 5 does not resume the printing paused in Step S16 but terminates the printing (S22). In other words, the print processing paused is not resumed but terminated. In this case, page data received from the client terminal device 2 and accommodated into the RAM 13 is deleted due to non-necessity, and the processing is returned to Step S11.

As described so far, the control unit 5 functioning as the print control unit cancels the pause and resumes the print processing in response to a fact that the first operation input of selecting the print resumption is accepted by the operation unit 17 and does not resume the print processing, which is paused, but terminates it in response to a fact that the first operation input of selecting the print discontinuation is accepted by the operation unit 17.

As apparent from the above description, when the print-start instruction is given in the client terminal device 2, the sampling data 35 is transmitted to the network printer 1. The sampling data 35 is information capable of identifying calibration information which is the basis of the correction data 36 used in correcting the image data subjected to print processing. In the network printer 1, the print processing is started and first, the sampling data 35 is received. The network printer 1 stores in the non-volatile RAM 14 the sampling data 32 generated when the calibration data 31 is obtained from the control unit 5. The sampling data 32 is information capable of identifying the calibration data 31. The network printer 1 makes a judgment as to whether the sampling data 32 stored in the non-volatile RAM 14 matches the received sampling data 35. Thereby, a judgment is made as to whether the sampling data 35, which is the basis of the correction data 36 used in correcting image data in the client terminal device 2, is the same with the updated sampling data 32 stored in the network printer 1. In other words, a judgment is made as to whether image data of the client terminal device 2 is corrected by using the correction data generated on the basis of the updated calibration data 31.

When the sampling data 32 stored in the non-volatile RAM 14 is judged to be coincident with the received sampling data 35, PDL data is judged to be corrected by the client terminal device 2 by using the correction data 36 generated on the basis of the updated calibration information. Here, the updated calibration information is data which is the same as the sampling data 32 stored in the non-volatile RAM 14. In other words, it is judged that calibration has been appropriately executed. Therefore, the print processing is executed, which receives the PDL data (page data) from the network printer 1 for printing.

When the sampling data 32 stored in the non-volatile RAM 14 is judged not to match the received sampling data 35, the PDL data is judged to be corrected by using correction data on the basis of previous calibration data and not by using the updated calibration data 31 by the client terminal device 2. In other words, it is judged that calibration has not been appropriately executed. Therefore, when the sampling data 32 stored in the non-volatile RAM 14 is judged not to match the received sampling data 35, print processing which receives the PDL data for printing is paused. Therefore, the print processing of image data corrected by using the correction data generated on the basis of previous calibration information is reliably prevented from being executed as it is in the network printer 1, without obtaining the calibration information from the network printer 1 every time a print-start instruction is given.

Further, when the sampling data 32 is judged not to match the sampling data 35, the first selection screen 40 is displayed to enable selection of the print resumption or the print discontinuation. Upon acceptance of the first operation input made by a user selecting the print resumption, it is judged that no correction is needed on the basis of the updated calibration data 31 and the pause of print processing is cancelled to resume the print processing. When the first operation input made by a user selecting the print discontinuation is accepted, the print processing of PDL data, which is paused, is not resumed but terminated.

<Modified Aspect>

Hereinafter, a description will be given of a modified aspect of the present invention. It is noted that a network printer 1 and a client terminal device 2 of the modified aspect are configured similarly as in the above aspect. Therefore, substantially different points will be described as follows.

Figure 10:
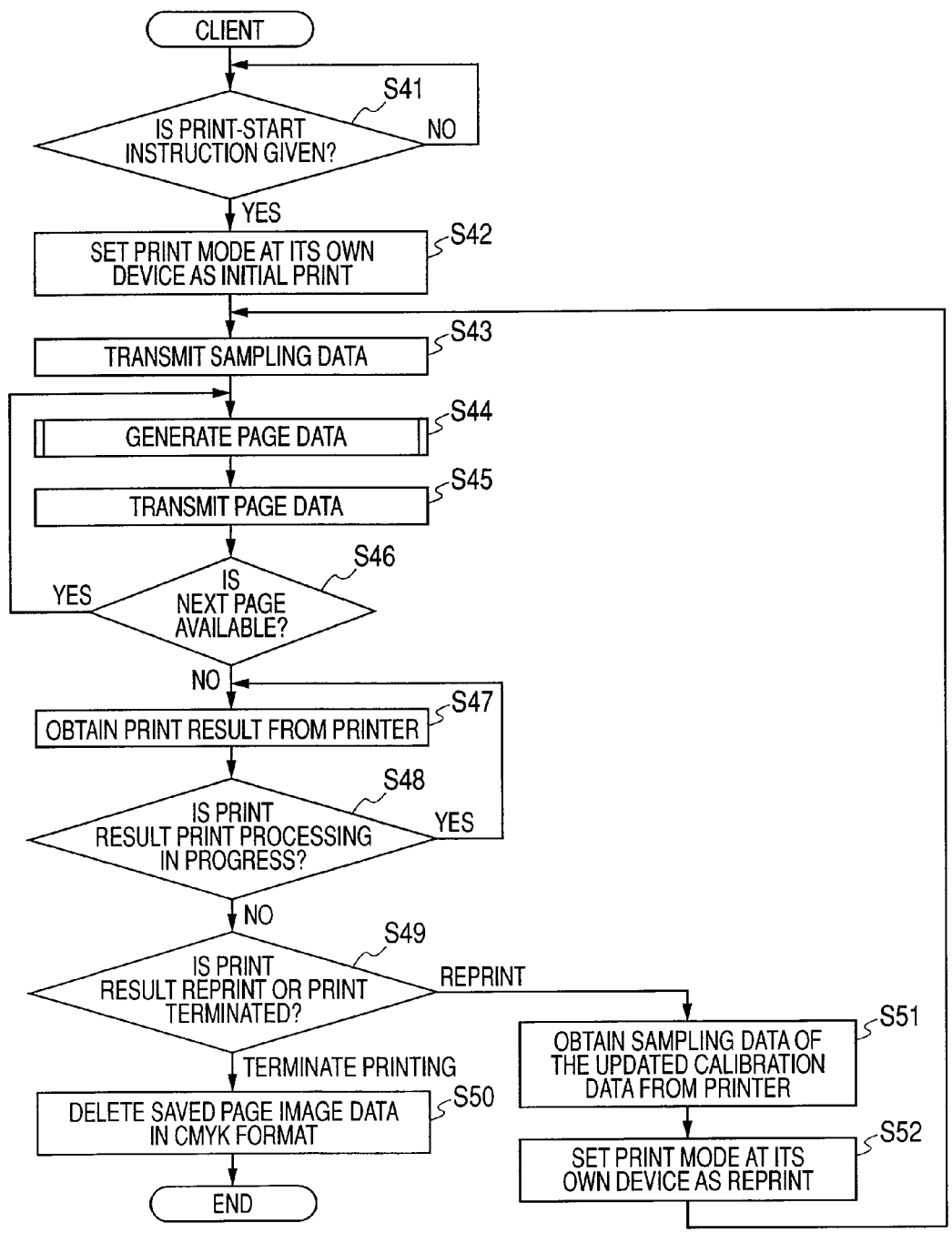
FIG. 10 is a flow chart showing processing actions executed in the client terminal device when the print-start instruction is input in a modified aspect of the present invention.
Figure 11:
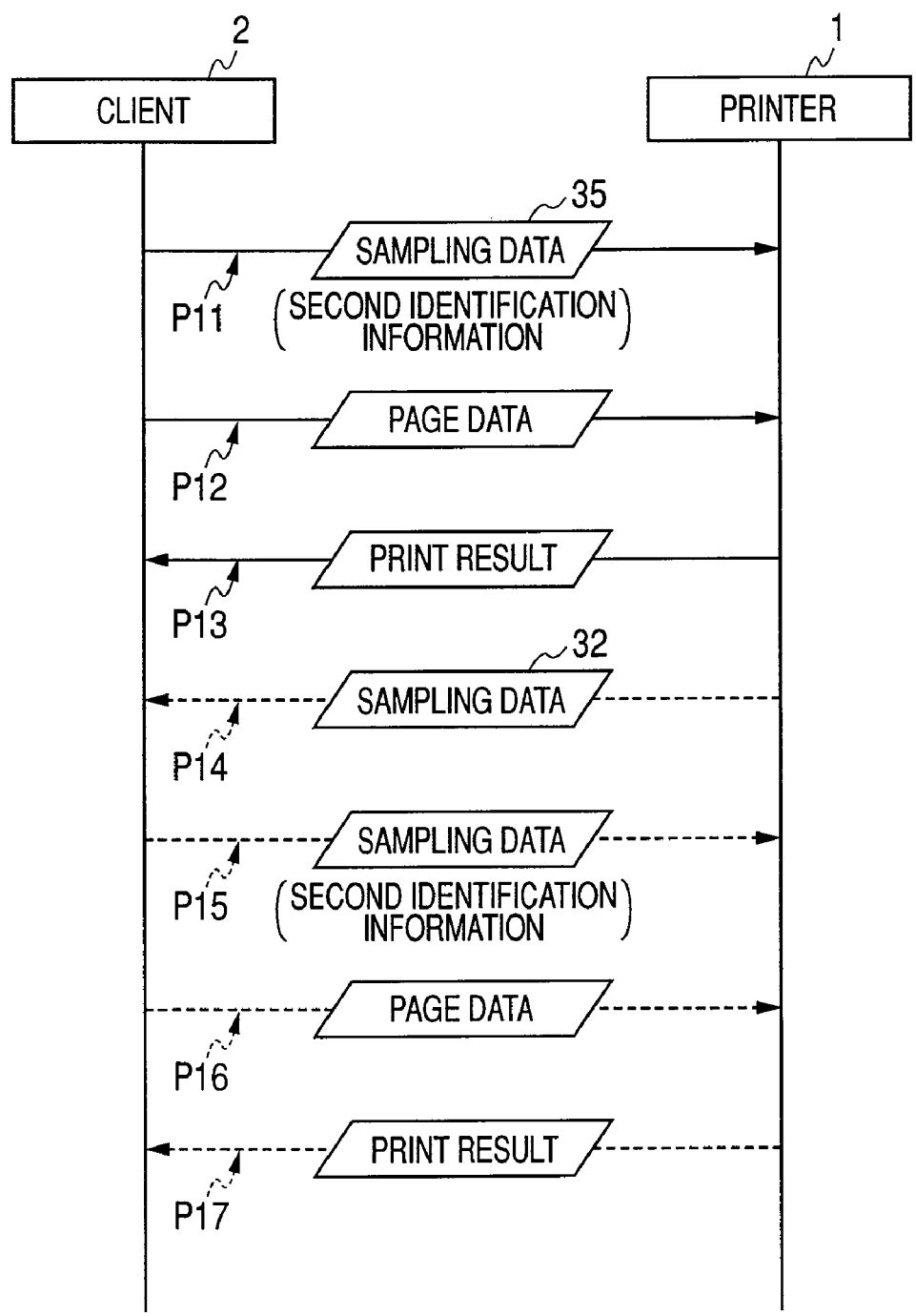
FIG. 11 is a diagram for explaining data transmitted between the client terminal device and the network printer in the modified aspect.
Figure 12:
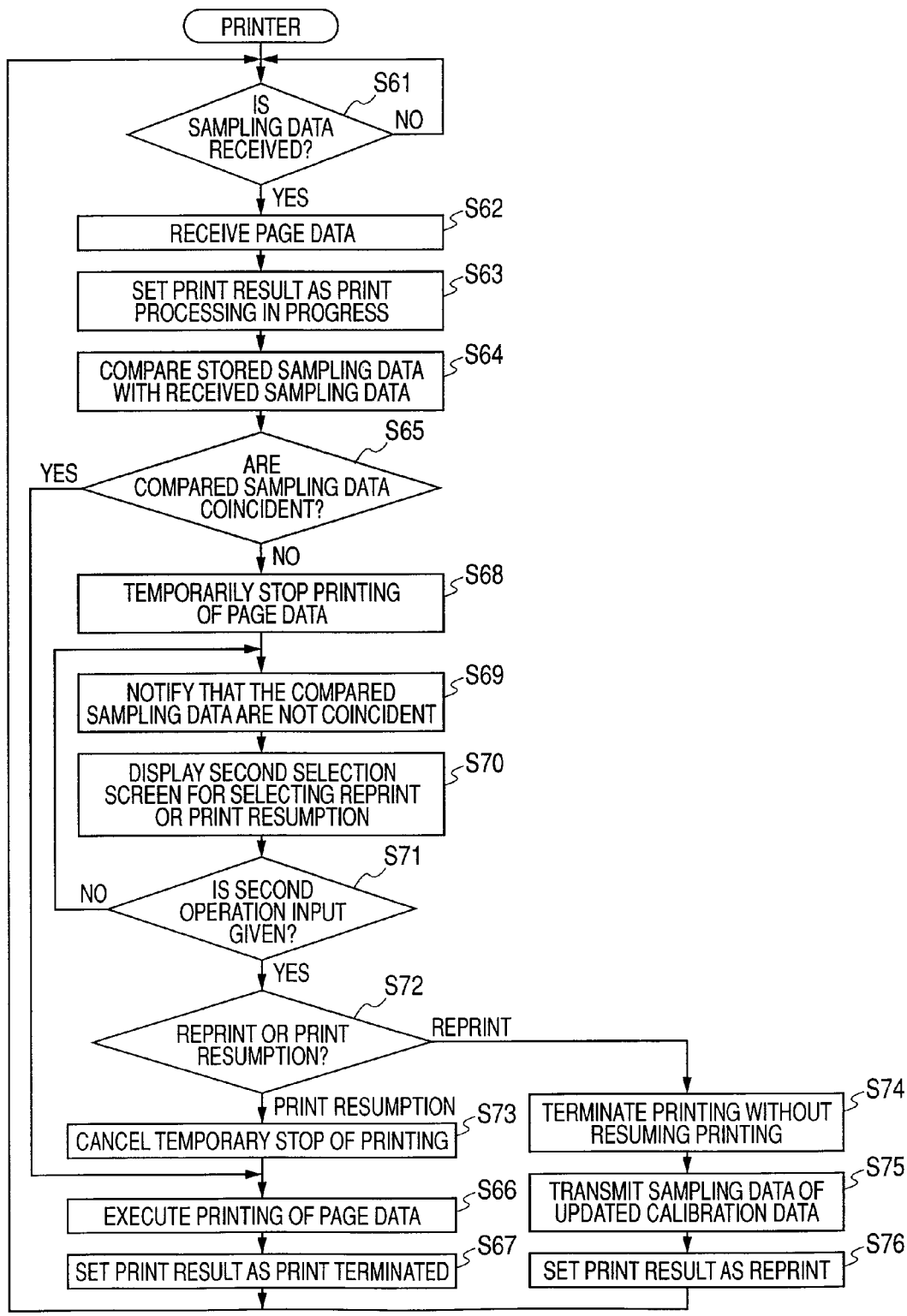
FIG. 12 is a flow chart showing processing actions executed in the network printer when sampling data is received in the modified aspect.

FIG. 10 is a flow chart showing processing actions executed in the client terminal device 2 when a print-start instruction is input in the modified aspect. FIG. 11 is a diagram for explaining data transmitted between the client terminal device 2 and the network printer 1 in the modified aspect. FIG. 12 is a flow chart showing processing actions executed in the network printer 1 when the sampling data 35 is received in the modified aspect.

The control unit 7 of the client terminal device 2 judges whether the print-start instruction is given (S41) as with Step S1 (refer to FIG. 5). When the print-start instruction is judged not to be given (S41: NO), the processing is kept on standby. When the print-start instruction is judged to be given (S41: YES), the control unit 7 sets up the print mode of the client terminal device 2 as "initial print" (S42). Incidentally, the print mode is setting information of page-data generating processing in S44, which will be described later, and the page data is to be generated based on a print mode. This print mode is accommodated into the RAM 23. The print mode accommodated into the RAM 23 is either "initial print" or "reprint." When the print mode is set as "initial print," the image data to be printed is to be corrected by using previously generated correction data 36. When the print mode is set as "reprint," sampling data 32 is obtained from the network printer 1, and calibration data is reproduced on the basis of the obtained sampling data 32. In other words, the calibration data 31 is reproduced. Then, on the basis of the reproduced calibration data, new correction data different from the correction data 36 is generated, and image data to be printed is corrected by using the generated correction data. The page data generating processing in S44, which is executed on the basis of the print mode, will be described later in detail by referring to FIG. 14.

After the print mode is set as "initial print" in Step S42, the control unit 7 transmits the sampling data 35 stored in the HDD 24 as the second identification information, as with the processing action in Step S2, via the LAN I/F 27 to the network printer 1 (S43, P11). Then, page data, which is the image data to be printed, is generated (S44), and the generated page data is transmitted to the network printer 1 (S45, P12).

After the page data is transmitted in Step S45, the control unit 7 judges whether a next page is available (S46). When the next page is judged to be available (S46: YES), the next page is subjected to processing actions in Step S44 and the S45. As described above, the client terminal device 2 transmits page data covering all pages subjected to print processing to the network printer 1, after the sampling data 35 has been transmitted.

On the other hand, as shown in FIG. 12, the control unit 5 of the network printer 1 makes a judgment as to whether the sampling data 35 transmitted from the client terminal device 2 is received (S61). When the sampling data 35 is judged not to be received (S61: NO), the processing is kept on standby. When the sampling data 35 is judged to be received (S61: YES), the page data transmitted from the client terminal device 2 is received subsequently to the sampling data 35 (S62).

Next, when the sampling data 35 has been received, the control unit 5 sets print result as "print processing in progress" (S63). The print result is information indicating a progress state of the print processing in the network printer 1. The print result is accommodated into the RAM 13. The print result accommodated into the RAM 13 is any one of "print processing in progress," "print terminated" or "reprint." "Print processing in progress" is information indicating that the print processing is not terminated. "Print terminated" is information which indicates that the print processing is terminated. "Reprint" is information which indicates that the print processing is not executed to the end but discontinued and re-attempt of printing is required. The control unit 7 of the client terminal device 2 makes a judgment as to whether the print processing is terminated by obtaining the print result from the network printer 1. It also makes a judgment as to whether the image data to be printed should be again corrected to retransmit the PDL data.

After the print result is set as "print processing in progress" in Step S63, the control unit 5 compares the sampling data 35, which has been judged to be received in Step S61, with the sampling data 32 stored in the non-volatile RAM 14 (S64). Then, as with Step S14, the sampling data 32 and 35 are judged to match (S65). When the sampling data 35 is judged to match the sampling data 32 (S65: YES), the printer unit 16 is controlled, received page data is printed (S66), and after the printing of all page data so far received is completed, the print result of RAM 13 is set as "print terminated" (S67). The processing is returned to the step S61.

When the sampling data 32 is judged not to match the sampling data 35 (S65: NO), the control unit 5 temporarily stops the printing of page data received in Step S62 (S68). Thereby, the print processing of page data corrected by using the correction data 36 generated on the basis of previous calibration information can be prevented from being executed as it is in the network printer 1.

FIG. 13 is a screen diagram showing a second selection screen 50.

When the sampling data 32 is judged not match the sampling data 35 in Step S65, the display unit 18 notifies to the effect that the data concerned does not match (S69). The display unit 18 functions as the notification unit and the second displaying unit. Then, similarly when the data concerned is judged not to match, a second selection screen 50 for selecting reprint or print resumption (S70) is displayed. More specifically, as shown in FIG. 13, the second selection screen 50 including a message, for example, "calibration data is different," which indicates that the sampling data 32 and the sampling data 35 are different, or a message, for example, "no optimal printing result may be obtained if printing is continued. Is the printing re-attempted by obtaining again the calibration data?," which indicates to select the reprint or the print resumption.

In this case, notification of the effect of not being coincident is notified in conjunction with the second selection screen 50. However, it is also acceptable that notification of the effect of not being coincident and display of the second selection screen 50 for selecting the reprint or the print resumption are executed separately. For example, an alarm sound may be outputted to indicate that the sampling data 32 and the sampling data 35 are different, and the second selection screen 50 for selecting the print resumption or the print discontinuation may be displayed on the basis of the output of the alarm sound. Incidentally, the indication that the sampling data 32 is different from the sampling data 35 means that correction data generated on the basis of the calibration data 31 is different from the correction data 36.

The control unit 5 judges whether the second operation input of selecting the reprint or the print resumption is made via an operation unit 17 (S71). More specifically, a judgment is made for which respective button is depressed, that is, either a "GO" button for selecting to reprint by obtaining the updated calibration data 31 (sampling data 32 in this modified aspect) or a "CANCEL" button for selecting to print as it is (print resumption) is depressed. When the second operation input is not made (S 71: NO), processing actions in Step S69 and S70 are continued until a second operation input is made. When the second operation input is made (S71: YES), the operation unit 17 acting as the second accepting unit accepts the second operation input of selecting the reprint or the print resumption. The control unit 5 judges whether the second operation input accepted by the operation unit 17 is to select the reprint or the print resumption by referring to which button is depressed, that is, either the "GO" button or the "CANCEL" button is depressed (S72). When the second operation input accepted by the operation unit 17 is to select the print resumption (S72: print resumption), the control unit 5 cancels a paused printing (S73) and executes the processing in Step S66 to resume the printing temporarily stopped in Step S68. In other words, the paused print processing is cancelled to resume the print processing. Upon completion of the resumed print processing, the control unit 5 sets the print result of the RAM 13 as "print terminated," and the processing is returned to the step S61.

When the second operation input accepted by the operation unit 17 is to instruct reprint (S72: reprint), the control unit 5 does not resume the printing of page data temporarily stopped in Step S68 but terminates the printing (S74). In this case, the page data received from the client terminal device 2 and accommodated into the RAM 13 is deleted. The control unit 5 transmits the sampling data 32 of the updated calibration data 31 to the client terminal device 2 so that the client terminal device 2, which instructs the network printer 1 to execute the print processing, can execute calibration again (S75). More specifically, the sampling data 32 stored in the non-volatile RAM 14 is transmitted to the client terminal device 2. Then, the print result of the RAM 13 is set as "reprint" (S76), and the processing is returned to Step S61.

The sampling data 32 transmitted to Step S75 is that which is capable of reproducing the calibration data 31 stored in the non-volatile RAM 14 in the client terminal device 2.

As described above, the control unit 5 functioning as the print control unit does not resume the temporarily stopped print processing but terminates it in response to a fact that the second operation input of selecting reprint is accepted by the operation unit 17. The control unit 5 cancels the temporary stop and resumes the print processing in response to a fact that the second operation input of selecting print resumption is accepted by the operation unit 17. Further, the control unit 5 functioning as the second transmitting unit transmits the first identification information and the calibration information corresponding to the first identification information thereof to the client terminal device 2 in response to a fact that the second operation input of selecting reprint is accepted by the operation unit 17. In the present aspect, since the sampling data 32 is not only the first identification information but also the calibration information, only the sampling data 32 is transmitted to the client terminal device 2.

On the other hand, when the control unit 7 of the client terminal device 2, which has instructed the network printer 1 to print, judges that a next page is not available (S46: NO), the print result is obtained from the network printer 1 (S47, P13). Next, the control unit 7 makes a judgment as to whether the obtained print result is "print processing in progress" (S48). This judgment is made by receiving the print result of the non-volatile RAM 14 in the network printer 1. When the print result is judged to be "print processing in progress" (S48: YES), the processing is returned to the step S47. When the print result is judged not to be "print processing in progress" (S48: NO), a judgment is made as to whether the print result is "reprint" or "print terminated" (S49). When the control unit 7 judges that the print result is "print terminated" (S49: print terminated), page image data in CMYK format temporarily stored in the RAM 23 is deleted, which will be described later (S50). When the print result is judged to be "reprint" (S49: reprint), sampling data 32 of the updated calibration data 31 is obtained from the network printer 1 (S51, P14). More specifically, the sampling data 32 transmitted from the network printer 1 is received by the processing in Step S75. Then, the print mode of the client terminal device 2 is set as "reprint" (S52) and the processing is returned to Step S43.

Figure 14:
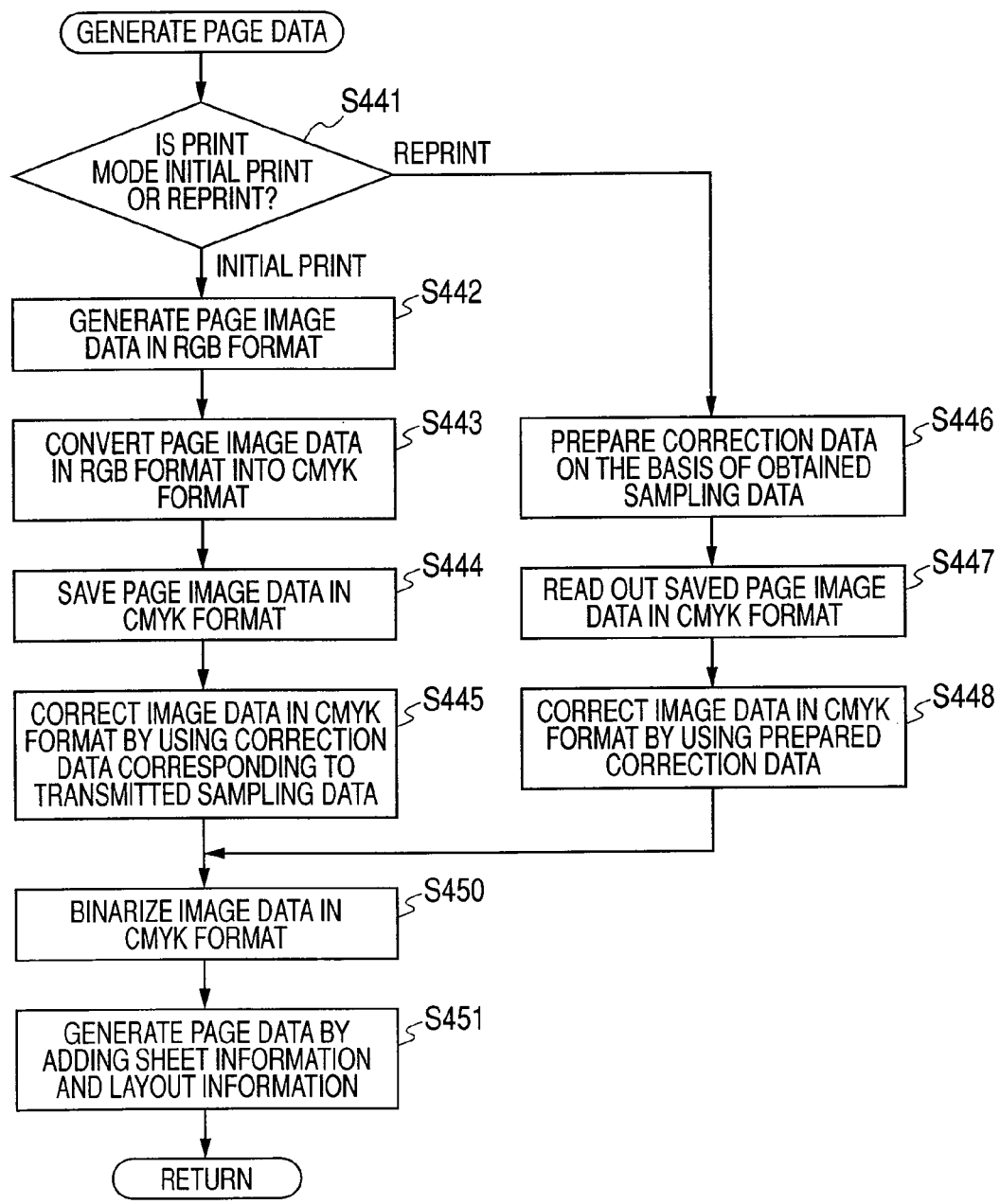
FIG. 14 is a detailed flow chart showing the page data generating processing of Step S44 in FIG. 10.

FIG. 14 is a flow chart showing the details of the page data generating processing of Step S44 in FIG. 10.

When the sampling data 35 stored in the HDD 24 is transmitted in Step S43, the control unit 7 makes a judgment as to whether the print mode of the RAM 23 is "initial print" or "reprint" (S441). When the print mode is judged to be "initial print" (S441: initial print), similarly as in Step S31, the page image data in RGB format is generated (S442) and similarly as in Step S32, the page image data in RGB format is converted into CMYK format (S443). The control unit 7 functioning as the storing unit stores the generated page image data in CMYK format (S444). More specifically, the generated page image data in CMYK format is temporarily accommodated into a predetermined domain of the RAM 23. In this case, the temporarily stored page image data is image data in a state before being corrected by using the correction data 36. Page image data deleted in the above-described Step S50 is the page image data saved in Step S444. Further, the page image data stored by the processing in Step S444 may be page image data in RGB format before converted into CMYK format. In other words, the page image data generated by the processing in Step S442 may be stored. Then, similarly as in Step S33, correction data 36 corresponding to the sampling data 35 transmitted in Step S43 is used to correct the page image data in CMYK format (S445).

When the print mode is judged to be "reprint" (S441: reprint), the control unit 7 generates the correction data on the basis of the sampling data 32 obtained from the network printer 1 in Step S51 (S446). The processing in Step S446 is executed similarly as explained by referring to FIG. 4. Then, as described above, since page image data in CMYK format is stored in the RAM 23 when the print mode is set as "initial print," the page image data in CMYK format is read out from the RAM 23 (S447). The control unit 7 uses correction data generated in Step S447 to correct the read-out page image data in CMYK format (S448).

The above-described processing in Steps S446 to S448 is operated as follows. In the network printer 1, when the second operation input of selecting reprint is accepted, the processing in Step S75 is executed. In other words, the sampling data 32 is transmitted to the client terminal device 2. When the sampling data 32 is transmitted from the network printer 1 before termination of the print processing of image data, the control unit 7 functioning as the correction unit rewrites the sampling data 35 stored in the HDD 24 to the sampling data 32. Thereby, the sampling data 35 is updated. Then, on the basis of the sampling data 32, the calibration data is reproduced. The reproduced calibration data is the same as the calibration data 31 stored in the non-volatile RAM 14. The control unit 7 generates new correction data on the basis of the reproduced calibration data to update the correction data 36. Thereby, the correction data corresponding to the updated calibration data 31 is obtained. The correction data used in the above processing in Step S448 is the obtained correction data 36. Then, the control unit 7 uses the generated correction data to correct the image data (page image data in CMYK format) saved in the RAM 23.

As described above, when the print mode is "initial print," the correction data 36 previously stored in the HDD 24 is used to correct page image data in CMYK format. When the print mode is "reprint," the correction data generated on the basis of the sampling data 35 newly obtained from the network printer 1 is used to correct page image data in CMYK format. In other words, when the sampling data 32 has been transmitted from the network printer 1 before termination of the print processing of corrected image data, the control unit 7 generates correction data on the basis of the sampling data 32 and uses the generated correction data to correct the saved image data.

Then, the control unit 7 uses an error diffusion method or a dither method to binarize multiple-value image data in CMYK format corrected by the processing in Step S445 or S448 (S450). Sheet information and layout information are added to the binarized page image data in CMYK format, thereby generating the page data (S451). Then, the processing is returned to the step S45.

As apparent from the above description, in the modified aspect, the print processing which receives the image data (in this case, PDL data) for printing is temporarily stopped when the sampling data 32 does not match the sampling data 35 in the network printer 1. Then, the second selection screen 50 is displayed, by which reprint or print resumption may be selected. When the second operation input selected by a user for print resumption is accepted, correction based on the updated calibration data 31 is judged not to be needed to resume the print processing of PDL data (page data), which is temporarily stopped. When the second operation input of selecting reprint is accepted, the temporarily stopped PDL data is discontinued for print processing. The print processing is controlled by the operational input by a user, thereby making it possible to prevent the output of print results, which are not intended by the user.

When the second operation input of selecting reprint is accepted, the sampling data 32, which is the updated calibration data 31 stored in the non-volatile RAM 14, is transmitted to the client terminal device 2 which is a source of the PDL data. The sampling data 32 is obtained by extracting a part of data from the updated calibration data 31 stored in the non-volatile RAM 14, that is, data capable of reproducing the updated calibration data 31 in the client terminal device 2. The sampling data 32 is sent to the client terminal device 2, by which the following processing can be executed in the client terminal device 2.

In other words, the sampling data 32 transmitted from the network printer 1 is received in the client terminal device 2 (P14). Correction data corresponding to the calibration data 31 is generated on the basis of the received sampling data 32. Image data (page image data in CMYK format saved in the RAM 23) before being corrected by using previous correction data (correction data 36 before update) is corrected on the basis of the generated correction data. The image data is corrected, by which sampling data corresponding to correction data used for the correction thereof is transmitted to the network printer 1 (P15). The sampling data transmitted in this case is the sampling data 32 obtained by the client terminal device 2 from the network printer 1, Therefore, the sampling data is coincident with the sampling data 32 stored in the non-volatile RAM 14. Thus, when page data of PDL data generated in the client terminal device 2 is received in the network printer 1 (P16), the print processing of the page data is executed without temporary stop. As a result, the print result of "print terminated" is obtained in client terminal device 2 (P17).

It is to be understood that the present invention is not restricted to the above-described aspects but may also include the following. That is, timing at which the calibration data 31 and the sampling data 32 are generated is not restricted to the every day generation as described in the aspects above. For example, the calibration data 31 and the sampling data 32 may be generated every time a predetermined number of recording sheets are subjected to print processing. Further, the calibration data 31 and the sampling data 32 may be generated every several hours.

Further, timing at which the sampling data 32 (calibration information and first identification information) is transmitted from the network printer 1 to the client terminal device 2 is not restricted to every three days. As long as timing of transmitting the sampling data 32 is not in synchronization with that of generating the sampling data 32 stored in the network printer 1, for example, two days may be acceptable. Further, as long as the timing of transmitting the sampling data 32 is not concurrent with that of updating the sampling data 32 stored in the network printer 1, the timing may not be necessarily in a regular manner.

Further, description has been given of an aspect in which the first selection screen 40 is displayed to select print resumption or print discontinuation and that in which the second selection screen 50 is displayed to select reprint or print resumption. There is, however, no restriction thereto in selecting the displayed selection screen or print processing. There is, for example, an aspect in which a third operation input is accepted via an operation unit 17 that when the sampling data 32 is judged not to be coincident with the sampling data 35, a third selection screen for selecting reprint or print discontinuation is displayed to select the reprint or the print discontinuation. There is also an aspect in which a fourth operation input is accepted via an operation unit 17 that when the sampling data 32 is judged not to be coincident with the sampling data 35, a fourth selection screen for selecting print resumption, reprint or print discontinuation is displayed to select the print resumption, the reprint or the print discontinuation.

Further, in the above aspects, description has been given of a case where when the sampling data 32 is judged not to be coincident with the sampling data 35, PDL data received by the network printer 1 in receipt processing is temporarily stopped for print processing. Such an aspect is also acceptable that when the sampling data 32 is judged not to be coincident with the sampling data 35, the PDL data is temporarily stopped for receipt processing. In other words, the control unit 5 functioning as the print control unit temporarily stops the receipt processing when the sampling data 32 is judged not to be coincident with the sampling data 35. Thereby, it is possible to prevent such useless processing that, for example, when printing is discontinued or reprint is executed, PDL data corrected by using correction data generated on the basis of previous calibration information is transmitted to the network printer 1.

Further, in the above aspects, description has been given of a case where the sampling data 32 is judged not to be coincident with the sampling data 35, a fact that the pieces of data concerned are not coincident is notified in the network printer 1. However, also acceptable is an aspect in which the effect of not being coincident is notified in the client terminal device 2. Also acceptable is an aspect in which the effect of not being coincident is notified both in the network printer and in the client terminal device.

Further, in the above aspects, description has been given of a case where a selection screen is displayed to accept an operation input in the network printer 1. However, also acceptable is an aspect in which a selection screen is displayed to accept an operation input in the client terminal device 2. In this case, the result judged by the network printer 1 may be transmitted to the client terminal device 2 which has instructed image data to be subjected to print processing.

Further, in the above aspects, description has been given of a case where a plurality of client terminal devices 2 is communicatively connected with one unit of network printer 1. Also acceptable is an aspect in which a plurality of client terminal devices 2 is communicatively connected with a plurality of network printers 1. In this case, each of the client terminal devices 2 may store in advance the calibration data 35 and the correction data 36 by every communicatively-connected network printer 1.

In the above aspects, description has been given of a case where the first identification information and the second identification information in the present invention are sampling data 32 and 35. However, the first identification information and the second identification information are not restricted to the sampling data 32 and 35. The first identification information and the second identification information may be, for example, generation dates and file names, as long as they are information respectively capable of identifying the sampling data 32 and 35. In this case, the generation dates are data indicating the dates when the sampling data 32 and 35 are generated. The file names are file names of the sampling data 32 and 35.

Still further, in the above aspects, description has been given of a case where the calibration information is sampling data 32 and 35. The calibration information may be calibration data. However, when the calibration data is given as calibration information, data quantity thereof is greater than the sampling data 32 and 35. This poses a problem that the calibration data needs a longer time to transmit the calibration information. Therefore, the sampling data 32 and 35 may be used as the calibration information.

In addition, in the above aspects, description has been given of a case where the image forming apparatus of the present invention is a network printer 1 having a printer function of executing the print processing of image data received externally. The image forming apparatus may a facsimile device having a printer function to or a copying machine having a copy function and a printer function.

What is claimed is:

1. An image forming apparatus for use with a display unit, the image forming apparatus comprising:
   a storage configured to store instructions;
   a processor configured to execute the instructions to cause the image forming apparatus to provide:
      a calibration information generating unit that generates first calibration information;
      an identification information generating unit that generates first identification information associated with the generated first calibration information;
      a receiving unit that receives second identification information associated with second calibration information from an external device;
      a print control unit that controls the image forming apparatus to pause a printing process based on a comparison result between the generated first identification information associated with the first calibration information and the second identification information associated with the second calibration information such that the display unit displays a selection screen for selecting resumption of the printing process or the discontinuation of the printing process when the generated first identification information does not match the received second identification information.

2. The image forming apparatus according to claim 1, further comprising:
   a transmitting unit that periodically transmits at least the generated first identification information to the external device.

3. The image forming apparatus according to claim 1, further comprising:
   a transmitting unit that periodically transmits at least the generated first calibration information to the external device.

4. The image forming apparatus according to claim 3, wherein the transmitting unit transmits the generated first calibration information and the generated first identification information to the external device.

5. The image forming apparatus according to claim 1, further comprising:
   an annunciation unit that indicates that the generated first identification information does not match the received second identification information.

6. The image forming apparatus according to claim 1, further comprising:
   a display;
   a displaying unit that displays a selection display for selecting resumption of the printing process or discontinuation of the printing process when the generated first identification information does not match the received second identification information; and
   an accepting unit that accepts an input signal of selecting the resumption of the printing process or the discontinuation of the printing process,
   wherein the print control unit resumes the printing process on the basis of the input signal indicating the resumption of the printing process, and
   wherein the print control unit terminates the printing process on the basis of the input signal indicating the discontinuation of the printing process.

7. The image forming apparatus according to claim 1, further comprising:
   a display;
   a displaying unit that displays a selection screen for selecting reprint or resumption of the printing process when the judging unit judges that the generated first identification information does not match the received second identification information;
   an accepting unit that accepts an input signal of selecting the reprint or the resumption of the printing process; and
   a transmitting unit that transmits the generated first identification information and the first calibration information corresponding to the generated first identification information in accordance with the accepted input signal indicates the reprint,
   wherein the print control unit controls the image forming apparatus to terminate the printing process when the accepted operation input indicates the reprint, and
   wherein the print control unit resumes the printing process when the accepted input signal indicates the resumption of the printing process.

8. The image forming apparatus according to claim 7, wherein the transmitting unit transmits the generated first identification information and the first calibration information to a device which is external device.

9. A computer program product embodied on a computer readable medium which, when executed by a computer, causes the computer to execute operations comprising:
   generating first calibration information;
   generating first identification information associated with the first calibration information;
   receiving second identification information associated with second calibration information;
   judging whether the generated first identification information, which is associated with the first calibration information, matches the received second identification information, which is associated with the second calibration information;
   controlling an image forming apparatus to pause a printing process based on a comparison result between the generated first identification information, which is associated with the first calibration information, and the received second identification information, which is associated with the second calibration information;
   outputting a selection screen for display; and
   receiving a selection regarding resumption of the printing process or the discontinuation of the printing process when the generated first identification information does not match the received second identification information.

10. The computer program product according to claim 9, wherein the control of the image forming apparatus to pause the printing process is executed when the generated first identification information does not match the received second identification information.

11. A printing system comprising:
   an external device that corrects image data by using correction data; and
   an image forming apparatus for use with a display unit, the image forming apparatus configured to communicate with the external device and is capable of receiving the corrected image data from the external device and printing the corrected image data, wherein the image forming apparatus comprises:
  a first storage configured to store instructions.,
  a first processor configured to execute the instructions to cause the image forming apparatus to provide:
    a calibration information generating unit that generates first calibration information;
    an identification information generating unit that generates first identification information associated with the generated first calibration information;
    a receiving unit that receives second identification information associated with second calibration data from the external device;
    a matching unit that determines whether the generated first identification information, which is associated with the first calibration information, matches the received second identification information, which is associated with the second calibration information; and
    a print control unit that pauses a printing process, which is instructed by the external device, based on whether the first identification information, which is associated with the generated first calibration information is determined to match the second identification, which is associated with the second calibration information by the matching unit, such that the display unit displays a selection screen for selecting resumption of the printing process or the discontinuation of the printing process when the generated first identification information does not match the received second identification information; and wherein the external device comprises:
  a second storage configured to store instructions;
  a second processor configured to execute the instructions to cause the external device to provide:
    a correction unit that corrects image data to be printed by the image forming apparatus by using correction data previously generated based the second calibration information;
    an identification information transmitting unit that transmits to the image forming apparatus the received second identification information; and
    an image data transmitting unit that transmits the corrected image data to the image forming apparatus after the transmission of the received second identification information.

12. The printing system according to claim 11, wherein the image forming apparatus further comprises an update information transmitting unit that transmits regularly to the external device the generated first calibration information and the generated first identification information, and wherein the external device further comprises:
  a first update unit that generates correction data based on the transmitted first calibration information; and
  a second update unit that updates the received second identification information stored therein to the generated second identification information transmitted by the update information transmitting unit.

13. An image forming apparatus for use with a display unit, the image forming apparatus comprising:
  a storage configured to store instructions;
  a processor configured to execute the instructions to cause the image forming apparatus to provide:
  a calibration information generating unit that generates first calibration information;
  an identification information generating unit that generates first identification information associated with the generated first calibration information;
  a receiving unit that receives second identification information, which is associated with second calibration information from an external device;
  a matching unit that determines whether the generated first identification information, which is associated with the generated first calibration information matches the received second identification information, which is associated with second calibration information; and
  a print control unit that pauses a printing process based on whether the first identification information, which is associated with the generated first calibration information is determined to match the second identification, which is associated with the second calibration information by the matching unit such that the display unit displays a selection screen for selecting resumption of the printing process or the discontinuation of the printing process when the generated first identification information does not match the received second identification information.

14. The image forming apparatus according to claim 1, wherein the display unit is part of the image forming apparatus.

15. The image forming apparatus according to claim 1, wherein the display unit is remote from the image forming apparatus.

16. The printing system according to claim 11, wherein the display unit is part of the image forming apparatus.

17. The printing system according to claim 11, wherein the display unit is remote from the image forming apparatus.

18. The image forming apparatus according to claim 13, wherein the display unit is part of the image forming apparatus.

19. The image forming apparatus according to claim 11, wherein the display unit is remote from the image forming apparatus.

* * * * *